United States Patent
Elzur et al.

(10) Patent No.: US 7,346,701 B2
(45) Date of Patent: Mar. 18, 2008

(54) SYSTEM AND METHOD FOR TCP OFFLOAD

(75) Inventors: Uri Elzur, Irvine, CA (US); Frankie Fan, Diamond Bar, CA (US); Steve Lindsay, Mission Viejo, CA (US); Scott S. McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 743 days.

(21) Appl. No.: 10/652,267

(22) Filed: Aug. 29, 2003

(65) Prior Publication Data

US 2004/0042483 A1  Mar. 4, 2004

Related U.S. Application Data

(60) Provisional application No. 60/408,617, filed on Sep. 6, 2002, provisional application No. 60/407,165, filed on Aug. 30, 2002, provisional application No. 60/456,260, filed on Mar. 20, 2003, provisional application No. 60/456,265, filed on Mar. 20, 2003.

(51) Int. Cl.
G06F 15/16 (2006.01)
H04L 12/56 (2006.01)

(52) U.S. Cl. ............... 709/232; 709/236; 370/419

(58) Field of Classification Search ............. 709/232, 709/236; 370/463, 419, 392
See application file for complete search history.

(56) References Cited

U.S. PATENT DOCUMENTS

| | | | | |
|---|---|---|---|---|
| 5,805,927 A | | 9/1998 | Bowes et al. | |
| 5,841,989 A | * | 11/1998 | James et al. | 709/239 |
| 5,870,394 A | * | 2/1999 | Oprea | 370/392 |
| 5,937,169 A | * | 8/1999 | Connery et al. | 709/250 |
| 6,272,551 B1 | * | 8/2001 | Martin et al. | 709/250 |
| 6,289,023 B1 | | 9/2001 | Dowling et al. | |
| 6,570,884 B1 | * | 5/2003 | Connery et al. | 370/419 |
| 6,629,141 B2 | * | 9/2003 | Elzur et al. | 709/224 |
| 6,751,235 B1 | * | 6/2004 | Susnow et al. | 370/503 |
| 6,757,746 B2 | * | 6/2004 | Boucher et al. | 709/250 |
| 6,874,054 B2 | | 3/2005 | Clayton et al. | |
| 7,142,540 B2 | * | 11/2006 | Hendel et al. | 370/392 |
| 2002/0091844 A1 | | 7/2002 | Craft et al. | |
| 2003/0005143 A1 | * | 1/2003 | Elzur et al. | 709/232 |
| 2003/0005164 A1 | * | 1/2003 | Trainin | 709/250 |
| 2003/0158906 A1 | | 8/2003 | Hayes | |
| 2003/0185220 A1 | * | 10/2003 | Valenci | 370/398 |
| 2004/0042483 A1 | | 3/2004 | Elzur et al. | |
| 2004/0062275 A1 | | 4/2004 | Siddabathunl | |
| 2005/0165980 A1 | | 7/2005 | Clayton et al. | |
| 2005/0216597 A1 | | 9/2005 | Shah et al. | |

* cited by examiner

*Primary Examiner*—Joseph E. Avellino
(74) *Attorney, Agent, or Firm*—McAndrews Held & Malloy, Ltd.

(57) ABSTRACT

Aspects of the invention may comprise receiving an incoming TCP packet at a TEEC and processing at least a portion of the incoming packet once by the TEEC without having to do any reassembly and/or retransmission by the TEEC. At least a portion of the incoming TCP packet may be buffered in at least one internal elastic buffer of the TEEC. The internal elastic buffer may comprise a receive internal elastic buffer and/or a transmit internal elastic buffer. Accordingly, at least a portion of the incoming TCP packet may be buffered in the receive internal elastic buffer. At least a portion of the processed incoming packet may be placed in a portion of a host memory for processing by a host processor or CPU. Furthermore, at least a portion of the processed incoming TCP packet may be DMA transferred to a portion of the host memory.

33 Claims, 15 Drawing Sheets

SYSTEM AND METHOD FOR TCP OFFLOAD

CROSS-REFERENCE TO RELATED APPLICATIONS/INCORPORATION BY REFERENCE

This application makes reference to, and/or claims priority to and/or claims the benefit of:
U.S. Provisional Patent Application Ser. No. 60/408,617, filed on Sep. 6, 2002;
U.S. Provisional Patent Application Ser. No. 60/407,165, filed on Aug. 30, 2002;
U.S. Provisional Patent Application Ser. No. 60/456,260, filed on Mar. 20, 2003; and
U.S. Provisional Patent Application Ser. No. 60/456,265, filed on Mar. 20, 2003.

This application also makes reference to U.S. Provisional Application Ser. No. 60/551,361, filed on Mar. 10, 2004, which is hereby incorporated by herein by reference in its entirety.

The above-referenced United States provisional patent applications are hereby incorporated herein by reference in their entirety.

FIELD OF THE INVENTION

Certain embodiments of the present invention relate to processing of TCP data and related TCP information. More specifically, certain embodiments relate to a method and system for TCP/IP offload.

BACKGROUND OF THE INVENTION

The transmission control protocol/internet protocol (TCP/IP) is a protocol that has been widely utilized for communications. Conventional network interface cards (NICs) typically contain specialized processors or accelerators that may be adapted to handle the processing of packetized information received from a transmission medium. In a typical network interface card, the reception of data may include processing of packetized data in a plurality of communications layers before the data is copied to its final destination, for example, an application buffer. However, receiving, buffering, processing and storing the packetized data communicated in TCP segments can consume a substantial amount of host processing power and memory bandwidth at the receiver. With today's high speed communication systems of the order of Gigabits, these conventional network interface cards are inefficient and unable to manage such high speeds.

TCP segmentation is a technology that may permit a very small portion of TCP processing to be offloaded to a network interface card (NIC). In this regard, a NIC that supports TCP segmentation does not truly incorporate a full transmission control processing offload engine. Rather, a NIC that supports TCP segmentation only has the capability to segment outbound TCP blocks into packets having a size equivalent to that which the physical medium supports. Each of the outbound TCP blocks is smaller than a permissible TCP window size. For example, an Ethernet network interface card that supports TCP Segmentation, may segment a 4 KB block of TCP data into 3 Ethernet packets. The maximum size of an Ethernet packet is 1518 bytes inclusive of header and a trailing CRC.

A device that supports TCP segmentation does track certain TCP state information such as the TCP sequence number that is related to the data that the offload NIC is segmenting. However, the device that supports TCP segmentation does not track any state information that is related to inbound traffic, or any state information that is required to support TCP acknowledgements or flow control. A NIC that supports full TCP offload in the established state is responsible for handling TCP flow control, and responsible for handling incoming TCP acknowledgements, and generating outbound TCP acknowledgements for incoming data.

TCP segmentation may be viewed as a subset of TCP offload. TCP segmentation allows the protocol stack or operating system to pass information in the form of blocks of TCP data that has not been segmented into individual TCP packets to a device driver. The block of data may be 4 Kbytes or 16 Kbytes. A network adapter associated with the device driver may acquire the blocks of TCP data, packetize the acquired blocks of TCP data into 1518-byte Ethernet packets and update certain fields in each incrementally created packet. For example, the network adapter may update a corresponding TCP sequence number for each of the TCP packets by incrementing the TCP sequence number for each of the packets. In another example, an IP identification (IP ID) field and flag field would also have to be updated for each packet. One limitation with TCP segmentation is that TCP segmentation may only be done on a block of data that is less than a TCP window size. This is due to the fact that a device implementing TCP segmentation has no influence over TCP flow control. Accordingly, the device implementing TCP flow control only segments outbound TCP packets.

A TCP segmentation device does not examine incoming packets and as such, has no influence over flow control. Any received acknowledgement packet is passed up to the host for processing. In this regard, acknowledgement packets that are utilized for flow control are not processed by the TCP segmentation device. Moreover, a TCP segmentation device does not perform congestion control or flow startup and does not calculate or modify any variables that are passed back to the operating system and/or host system processor.

Another limitation with TCP segmentation is that information tracked by TCP segmentation is only information that is pertinent for the lifetime of the TCP data. In this regard, for example, the TCP segmentation device may track TCP segmentation numbers but not TCP acknowledgement (ACK) numbers. Accordingly, the TCP segmentation device tracks only a minimal subset of information related to corresponding TCP data. This limits the capability and/or functionality of the TCP segmentation device. A further limitation with TCP segmentation is that a TCP segmentation device does not pass TCP processed information back to an operating system and/or host processor. This lack of feedback limits the TCP processing that otherwise may be achieved by an operating system and/or host system processor.

Other limitations associated with TCP segmentation are set forth in U.S. patent application Ser. No. 10/652,183, filed Aug. 29, 2003, which is incorporated herein by reference in its entirety.

Since the processing of TCP segments may consume a substantial amount of host processing power and memory bandwidth, in order to alleviate consumption of host resources, some of the TCP processing may be offloaded from the host as shown in FIG. 1. FIG. 1 illustrates a conventional offload system. Referring to FIG. 1, the system may include a CPU 10, a memory controller 20, a host memory 30, a host interface 40, a network interface card (NIC) 50 and an Ethernet 60. The NIC 50 includes a TCP offload engine (TOE) 70, a transmission frame buffer 80 and a reception frame buffer 90. The CPU 10 is coupled to the memory controller 20. The memory controller 20 is coupled to the host memory 30 and to the host interface 40. The host interface 40 is coupled to the NIC 50 via the TOE 70. The TOE 70 is coupled to the transmission frame buffer 80, the reception frame buffer 90 and the Ethernet 60.

In operation, incoming frames from the Ethernet 60 are received by the NIC 50. The TOE 70 processes the frames and stores them in the reception frame buffer 90. When buffers are available in the host memory 30 and when sufficient frames have been stored, the TOE 70 receives the frames stored in the reception buffer 90 and sends the frames to host memory 30 via the host interface 40 and the memory controller 20. Outgoing frames from the host are sent to the TOE 70 which stores them in the transmission frame buffer 80. When transmitting, the TOE 70 retrieves the frames stored in the transmission frame buffer 80 and transmits them via the Ethernet 60. For high-speed networking such as 10 Gigabits per second Ethernet (GbE), additional copying of data may add unnecessary strain on a computer's or host's memory sub-system. The memory subsystem of most commercially available servers or host computers becomes a bottleneck, thereby preventing the system from supporting high data rates such as 10 Gigabit network traffic. Since TCP/IP is the dominant transport protocol utilized by most applications today, it would therefore be useful to ease the burden of this processing to achieve, for example, scalable low CPU utilization when communicating with a peer machine.

TCP/IP utilizes a datagram service at the IP layer. Under normal operational conditions with router or switch congestion, IP datagrams may be dropped, leading to a "hole" in the stream of datagrams that are on their way to the receiver. The receiver may therefore receive datagrams out of order. Packet drop may also be the result of, for example, other less frequent transmission errors. The common way to deal with this is to buffer the datagrams that were successfully received, while waiting to get the missing datagram or datagrams by retransmission from the source. Retransmission may be triggered by the sender or the receiver. The TCP protocol allows a complete TCP Window of datagrams per connection to be on-flight from the sender to the receiver assuming a high performance configuration. The datagrams may contain 64 KBytes of data, for example. Many applications employ a large number of TCP connections, for example, 1000 to 100,000 TCP connections, to be supported by the receiver. At higher network speeds such as 1 Gigabit per second and higher, it would be inefficient to discard or drain the pipe or a portion of a received data stream every time there is a dropped datagram. TCP bandwidth probing methodologies such as slow start and/or congestion avoidance, which may be triggered at connection startup or when congestion is detected, may result in the loss of precious time and is inefficient since the congestion window is decreased and has to be gradually increased until it is equivalent to a receiver's advertised window size. Therefore, typical TCP implementations set aside a large buffer such as 64 MB to 6.4 GB to handle these situations. This large buffer is used to reassemble TCP/IP data, or IP fragments. The depth of the buffer may be dependent upon the product of connection bandwidth and network delay on the TCP connection. This architecture is therefore sensitive to LAN or WAN configuration and in this regard, more buffers may be utilized for a medium bandwidth, high-delay WAN configuration than for a low delay, high-speed LAN configuration.

The TCP offload architecture illustrated in FIG. 1 is also known as a store & forward approach. It adds latencies that are utilized to store the data in the buffers 80, 90 of the NIC 50, to manage the buffers 80, 90 and to retrieve information in an ordered fashion out of the buffers 80, 90 and into the host memory 30. During reception, received packets may be stored in the receive frame buffer 90 where they are processed. When packets arrive out-of-sequence, instead of dropping previously received associated packets, the received packets are buffered until missing packets are subsequently received. The received missing packets and the out-of-sequence packets are then reassembled or reordered. The assembled or reordered packets are then processed to determine where they should be placed on the host system. Once the placement of the assembled packets is determined, the assembled packets are then passed to the host where they are stored for processing. This respective buffering, processing, reassembling or reordering, processing and placement requires an excessive amount of memory and consumes an extensive amount of processing resources.

Similar considerations are applicable for the transmit side. A TCP sender maintains a transmit frame buffer 80 with all the data it has transmitted as part of the TCP "window". Once the remote side acknowledges reception of the data, the sender frees the transmit frame buffer 80 and the edge of the TCP window moves to the right. The size of the transmission frame buffer 80 is similar to that of the reception frame buffer 90, since outstanding data that has not been acknowledged are buffered there, thereby allowing the sender to retransmit in case the receiver on the remote side has not received one or more of the datagrams. Similar to the receive side, this is also a store & forward architecture.

Further limitations and disadvantages of conventional and traditional approaches will become apparent to one of ordinary skill in the art through comparison of such systems with some aspects of the present invention as set forth in the remainder of the present application with reference to the drawings.

BRIEF SUMMARY OF THE INVENTION

Certain embodiments of the present invention may found in a system and method for TCP offloading. The system may comprise a host comprising a host memory and a network interface card (NIC) coupled to the host. The NIC may comprise at least one TCP enabled Ethernet controller (TEEC). The TEEC may comprise at least one internal elastic buffer. In this regard, the TEEC may comprise a receive internal elastic buffer and/or a transmit internal elastic buffer. The TEEC may be configured to process an incoming TCP packet once without any assembly. In this regard, the TEEC may process an incoming TCP packet once without assembling the TCP packet data with the TCP data from adjacent packets for the same flow, and temporarily buffer at least a portion of the incoming TCP packet in the internal elastic buffer. At least a portion of the incoming TCP packet may be temporarily buffered in the receive internal elastic register. In a somewhat similar manner, at least a portion of a TCP packet that is to be transmitted may be temporarily buffered in the transmit internal elastic buffer.

The TEEC may be adapted to place at least a portion of the incoming TCP packet data into at least a portion of the host memory. The TEEC may place at least a data portion of an incoming TCP packet into a highest hierarchy of buffer available in the host memory by performing a single copy operation. The TEEC may DMA transfer at least a portion of the processed incoming TCP packet to at least a portion of the host memory. The TEEC may also place at least a portion of the processed incoming TCP packet into host buffers in the host memory for reassembly. The TEEC may be a single chip, which may have at least one internal elastic buffer integrated therein. In this regard, the receive internal elastic buffer and the transmitted internal elastic buffers are integrated with the TEEC.

The method for offloading TCP processing may comprise receiving an incoming TCP packet at a TEEC and processing at least a portion of the incoming packet once by the TEEC without having to do any reassembly or retransmission by the TEEC. At least a portion of the incoming TCP packet may be buffered in at least one internal elastic buffer of the TEEC. The internal elastic buffer may comprise a receive internal elastic buffer and/or a transmit internal elastic buffer. At least a portion of the incoming TCP packet may be buffered in the receive internal elastic buffer. At least a portion of the processed incoming TCP packet may be placed in a portion of a host memory. In this regard, at least a portion of the processed incoming TCP packet may be placed in a highest hierarchy of buffer available in a host memory by performing a single copy operation. At least a portion of the processed incoming TCP packet may be DMA transferred to a portion of the host memory.

In accordance with an aspect of the invention, TCP packets that are temporarily buffered in the internal elastic buffer do not comprise packets for reassembly and packets for retransmission. A portion of the processed incoming TCP packet may be placed in host buffers located in a host memory for processing by a host processor or CPU. The TEEC may be a single chip having at least one internal elastic buffer. Notwithstanding, the receive internal elastic buffer and the receive internal elastic buffer may be integrated with the chip.

Another embodiment of the invention may also provide a machine-readable storage, having stored thereon, a computer program having at least one code section for providing TCP offload. The at least one code section may be executable by a machine for causing the machine to perform steps as described above for TCP offload.

These and other advantages, aspects and novel features of the present invention, as well as details of an illustrated embodiment thereof, will be more fully understood from the following description and drawings.

DETAILED DESCRIPTION OF THE INVENTION

Figure 1:
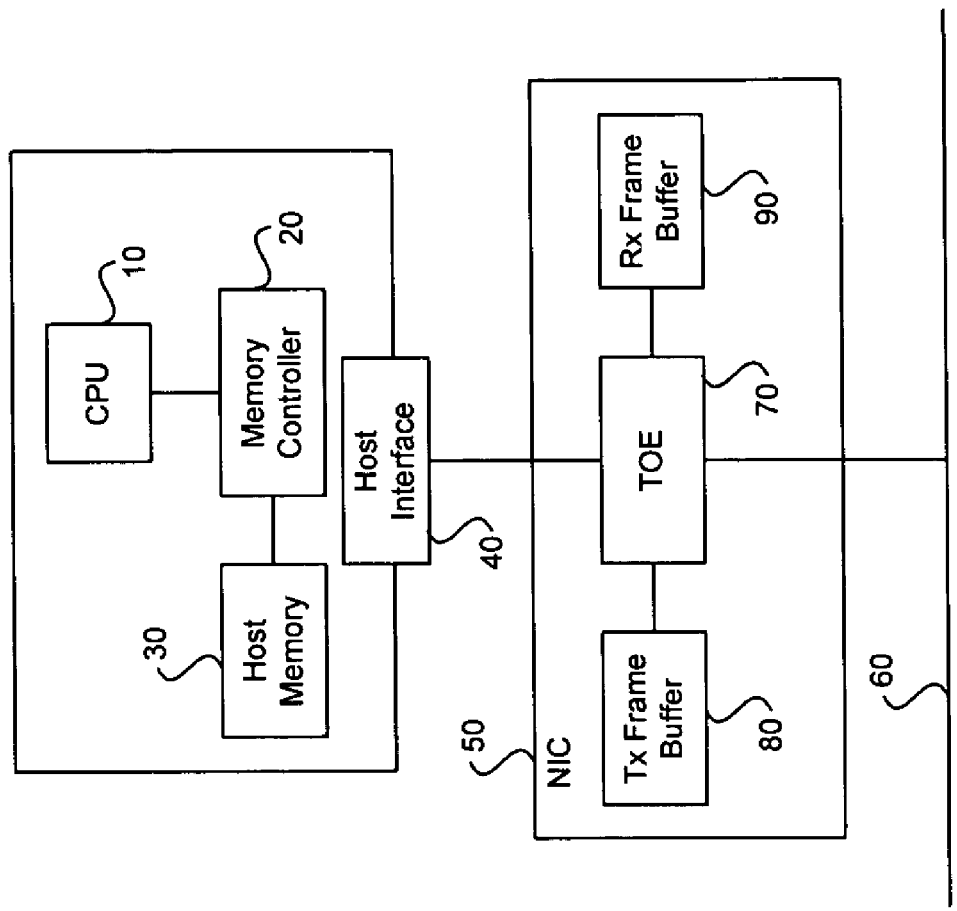
FIG. 1 illustrates a conventional TCP offload system.

Certain embodiment of the invention may be found in a system and method for TCP offload. The method may comprise receiving an incoming TCP packet at a TEEC and processing at least a portion of the incoming TCP packet once by the TEEC without having to do any reassembly or retransmission by the TEEC. At least a portion of the incoming TCP packet may be buffered in at least one internal elastic buffer of the TEEC. The internal elastic buffer may comprise a receive internal elastic buffer and/or a transmit internal elastic buffer. Accordingly, at least a portion of the incoming TCP packet may be buffered in the receive internal elastic buffer. At least a portion of the processed incoming packet may be placed in a portion of a host memory. In this regard, at least a portion of the processed incoming TCP packet may be placed in a highest hierarchy of buffer available in a host memory by performing a single copy operation. Furthermore, at least a portion of the processed incoming TCP packet may be DMA transferred to a portion of the host memory.

In accordance with an embodiment of the invention, out-of-order TCP packets may be stored in a small internal elastic buffer The elastic buffer may be a , for example, 64 KB on-chip packet buffer that is utilized to provide elasticity as opposed to a large, for example, multi-megabyte memory that is utilized for packet re-ordering, reassembly and/or retransmission. The elastic buffer in accordance with the various embodiments of the invention may be typically by a NIC to temporarily buffer at least a portion of an incoming TCP packet. Additionally, a NIC in accordance with an embodiment of the invention will not comprise a dedicated memory which is to be utilized for reordering or reassembling out-of-sequence TCP packets or IP fragments. Furthermore, in accordance with an embodiment of the invention, the NIC will not include a large TOE dedicated memory that is utilized for packet retransmission and/or packet reassembly. Accordingly, no packet reassembly and/or packet retransmission buffering need be done by a TCP enabled Ethernet controller (TEEC).

Transmission control protocol/internet protocol (TCP/IP) is the leading protocol for network and Internet-based data transfers. The use of TCP/IP is expanding beyond application-to-application communications and file-based storage such as network file system (NFS) and common Internet file system (CIFS) to block-based networked storage such as Internet small computer system interface (iSCSI). TCP/IP may also be used for the transport layer for clustering/Inter-Process-Communication (IPC) using a Remote-DMA (RDMA) protocol.

Processing TCP/IP at wire speed may fully consume, for example, a 1 GHz processor. Using a TCP-enabled Ethernet controller (TEEC) may provide, for example, one or more of the following advantages: reduced host CPU utilization, for example, from approximately 100% when running TCP/IP application to less than approximately 10%; fewer data copies; and fewer interrupts and context switches, which free the host CPU and the system for application processing. Such benefits become even more evident at higher speeds. From a system perspective, using a TEEC NIC may provide a better return-on-investment (ROI), even if some average selling price (ASP) premium over a regular GbE NIC is present, than employing a dedicated processor or substantial portions thereof and its associated system for TCP processing.

Certain aspects of the invention may provide for handling of TCP/IP datagrams in a flow-through manner by dedicating a minimal amount of memory to the transmit path and to the receive path of the TEEC. The respective buffering, processing, reassembling or reordering, processing and placement methodology employed by existing off load systems, for example FIG. 1, requires an excessive amount of memory on the receive and transmit sides and consumes an extensive amount of processing resources. However, in accordance with an embodiment of the invention and with reference to FIG. 2, the transmit elastic buffers 280 and the receive elastic buffers 290 operate in a manner that provide a flow through design. In this regard, the transmit elastic buffers 280 and the receive elastic buffers 290 of the TEEC 270 may be adapted to temporarily buffer received packets and are utilized to provide elasticity in order to accommodate, for example, varying data rates between the Ethernet Interface and the host interface, for example a PCI interface, to the computer. Accordingly, the TEEC 270 and its associated receive elastic buffer 290 may operate in a manner so that received packets are temporarily buffered in the receive elastic buffer 290, processed and placed in the host memory 230. This flow-through processing eliminates any need for reassembling or reordering out-of sequence packets in the receive elastic buffer 290. As a result, the respective buffering, processing, reassembling or reordering, processing and placement methodology employed by existing off load systems is minimized to processing and placement.

In accordance with an aspect of the invention, the TEEC 270 does not require a dedicated memory that is utilized for assembling and/or re-ordering IP packets fragmented at the IP layer. In this regard, out-of-order TCP packets are not stored, re-ordered and/or assembled in a TEEC buffer. Accordingly, the NIC may comprise a single chip, having integrated therein, at least one internal elastic buffer and no internal buffers or interfaces to external buffers that would be utilized for packet retransmission, packet re-assembly and packet re-ordering.

Figure 2:
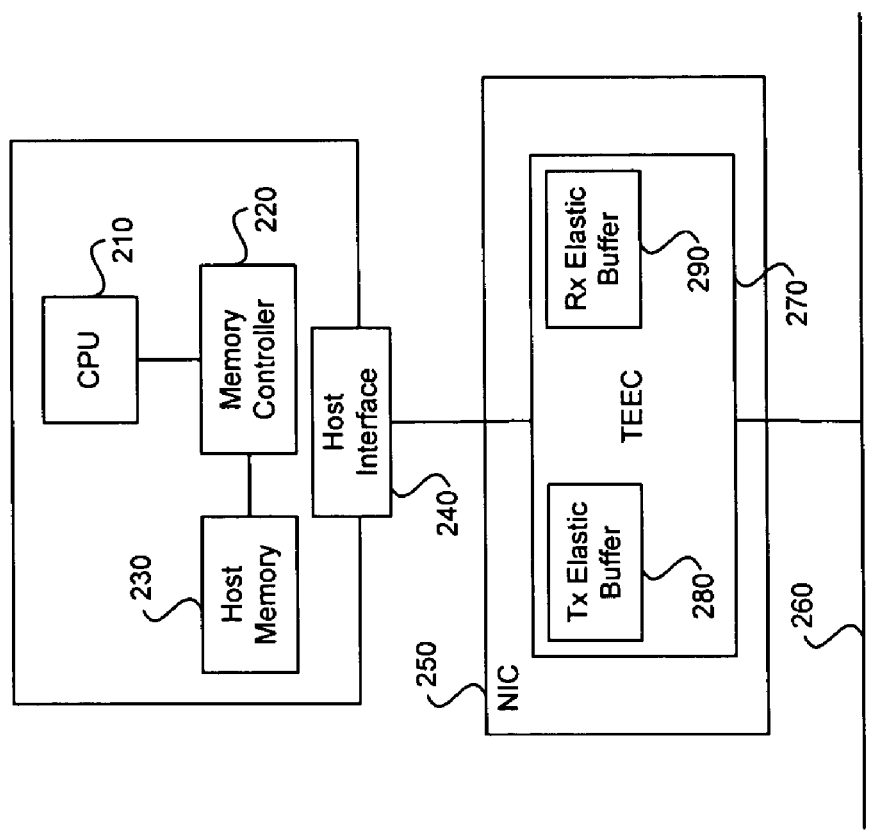
FIG. 2 is a block diagram of an exemplary system that may be utilized to handle TCP/IP datagrams in a flow-through manner in accordance with an embodiment of the invention.

FIG. 2 is a block diagram of an exemplary system that may be utilized to handle TCP/IP datagrams in a flow-through manner, in accordance with an embodiment of the invention. Referring to FIG. 2, the system may comprise, for example, a CPU 210, a memory controller 220, a host memory 230, a host interface 240, a network interface card (NIC) 250 and an Ethernet 260. Although illustrated, for example, as a CPU 210 and an Ethernet 260, the present invention need not be so limited and may employ, for example, any type of processor and any type of data link layer or physical media. The NIC 250 may comprise, for example, a TEEC 270, transmit elastic buffer 280 and a receive elastic buffer 290. The transmit elastic buffer 280 and a receive elastic buffer 290 may be internal elastic buffers.

Although illustrated as a controller to the Ethernet 260, the TEEC 270 may be a controller to any type of data link layer or physical media. In one embodiment of the invention, the TEEC 270 may provide at least some functionality of a TOE. The host interface 240 may be, for example, a peripheral component interconnect (PCI), PCI-X, ISA, SCSI or another type of bus. The memory controller 230 may be coupled to the CPU 220, to the memory 230 and to the host interface 240. The host interface 240 may be coupled to the NIC 250 via the TEEC 270. Finally, the TEEC 270 may be coupled to the Ethernet 260.

In operation, on the receive side, a packet or frame may be received by the NIC 250 from the Ethernet 260. In general, the TEEC 270, for example, may parse and process the headers and may temporarily buffer the received packet into a particular location of the receive elastic buffer 290. In this regard, the TEEC may process each incoming packet "on the fly." Based on, for example, control information, header information and/or payload information associated with the received packet, placement information may be determined and/or ascertained. Upon determining the placement information for the received packet, the TEEC 270 may transfer the received packet to the host where the received packet may be stored in the host memory 230 for processing.

In one aspect of the invention, at least a portion of the received packets may have been processed by the TEEC 270 and may be queued in the receive elastic buffer 290. The queued portion of the received packet may be DMA transferred from the receive elastic buffer 290 into the host memory 230. In this regard, the TEEC 270 may comprise suitable DMA hardware and/or code that may be adapted to directly transfer the portions of the received packet from the receive elastic buffer 290 to the host memory 230 via the host interface 240. Therefore, packets may be transported from the wire of the Ethernet 260, processed "on the fly" and temporarily buffered in the receive elastic buffer 290. Due to the "on-the-fly" processing and temporary buffering in the NIC 250, no reassembling or reordering of packets is done on the NIC 250.

In another aspect of the invention, the system may also handle out-of-order frames as may occur during, for example, frame delay or frame loss. For example, the TEEC 270 may manage the hole or holes until the correct data is received. On the transmit path, transmission may be accomplished from the transmit elastic buffers 280 of the NIC 250. In this regard, TCP data that is to be sent to the Ethernet interface may be transferred from the host memory 230 and temporarily buffered in the transmit elastic buffer 280. The TEEC 270 may perform an "on-the-fly" transmission. The TEEC 270 may fetch the transmit TCP data from the host, temporarily buffer the fetched data in the transmit elastic buffer and process the data for transmission. This comprises constructing this data into one or more Ethernet packets, by formatting and appending higher layer protocol headers and error recovery codes. After transmission, the data may be maintained on the host under the ownership of, for example, the TEEC 270. In an aspect of the invention, no copy of the packets or outstanding TCP transmit data is stored locally on the TEEC 270 to facilitate retransmission. In this regard, the TEEC 270 may be adapted to facilitate retransmission by fetching data again from the host memory 230 and temporarily buffering the fetched data in the transmit elastic buffer 280. Once data has been acknowledged by a remote peer, the host buffers of the sender may be freed to their original owner such as an application or a ULP.

In accordance with the invention, on the receive side, unlike the TOE 70 of FIG. 1, the TEEC 270 may not have a dedicated external memory that is utilized for re-ordering TCP traffic to deal with, for example, out-of-order received TCP segments. Moreover, the TEEC 270 may not be adapted to reassemble or reorder out-of-order received TCP segments. However, the TEEC 270 may be adapted to handle out-of-order segments without utilizing an external dedicated memory and without re-ordering the frames prior to DMA transfer of the TCP segments in the host memory 230. In another aspect of the invention, the internal memory utilized by the TEEC 270 is small compared to the memory utilized by the conventional TOE 70. This smaller internal memory utilized by the TEEC 270 provides elasticity and may, for example, be utilized to account for the internal delays associated with "on the fly" processing. The smaller internal memory of the TEEC 270 may also provide elasticity when buffering received frames containing insufficient placement information. Given its size, the smaller memory of the TEEC 270 is not utilized to buffer packets that may otherwise be retransmitted if a packet is not acknowledged (ACK'd)

In certain aspects of the invention, the host memory 230 may be utilized, for example, to re-assemble receive traffic or for transmit activity and retransmit activity. This eliminates the need for the TEEC 270 to have dedicated external memory. This may reduce, for example, one or more of the following: cost, complexity, footprint and power consumption. In addition, this may eliminate or reduce bandwidth-delay-product dependency. The host memory 30 may be typically larger and more scalable than any memory that can be economically and feasibly attached to a TEEC. It may also represent the limit for the ability of a machine to buffer data since it may be the source and destination for the data, when applications and TCP are launched. It may also represent the limit of monolithic software stacks.

Certain embodiment of the invention may also provide a virtually bufferless or reduced buffer architecture when compared to conventional offload engines. In this regard, although not a truly bufferless design, when compared to the conventional TOE 70 of FIG. 1, the internal memory of the TEEC 270 is significantly smaller in size. These architectures may contemplate maintaining a small amount of memory such as a FIFO on the TEEC 270. In the case of a FIFO, the FIFO would provide elasticity and replace a need for a dedicated external memory on the TEEC or the NIC. Accordingly, this may facilitate the processing of TCP segments "on the fly." The processing of segments "on the fly" may be regarded as a "one touch approach," that may move the TCP segments, for example, into the highest hierarchy of buffer available at the time for the protocol level that is being processed. For example, a Layer 5 (L5) or higher application buffer may provide better performance than a dedicated L4 TCP buffer or a generic L4 TCP buffer because using the L5 or higher application buffer may save additional copy processing steps. It also may eliminate or reduce the need for any intermediate buffer, for example, on the transmit path.

The virtually bufferless architecture or reduced buffer architecture for the TEEC may be extended to as high a level of processing as may be supported by a particular TEEC during its "one-touch" processing. Data may be placed directly in an L5 or higher buffer if that buffer information and protocol parsing information can be supplied to the TEEC system. The virtually bufferless or reduced buffer architecture may support concurrent operation, for example, of TCP Layer 2 (L2), Layer 4 (L4) and Layer 5 (L5) with a flexible switch between them.

In an aspect of the invention, the TEEC 75 may act as a pure Ethernet controller and provide a complete set of L2 services, unlike many conventional TOE devices. The TEEC 75 may also act as a pure TEEC or may have some of the traffic, for example, at L2 such as non-TCP Ethernet traffic, and some at L4. For the L2 traffic, L2 services may be provided such as, for example, Ethernet address comparison and CRC computation. For the L4 traffic, additional services may be provided including, for example, TCP/IP processing on the device. The TEEC 75 may also act as a pure L5 or higher enabled controller. Any level of processing may also be used in any combination for different connections passing through the TEEC 75. There may be no limit on the traffic mix and no need for external software intervention to help the hardware manage it. Some embodiments according to the invention may target only L4 services. This novel approach to TCP/IP processing may not be necessarily dependent on the Ethernet and may be applied to any other L1/L2 interfaces.

Figure 12:
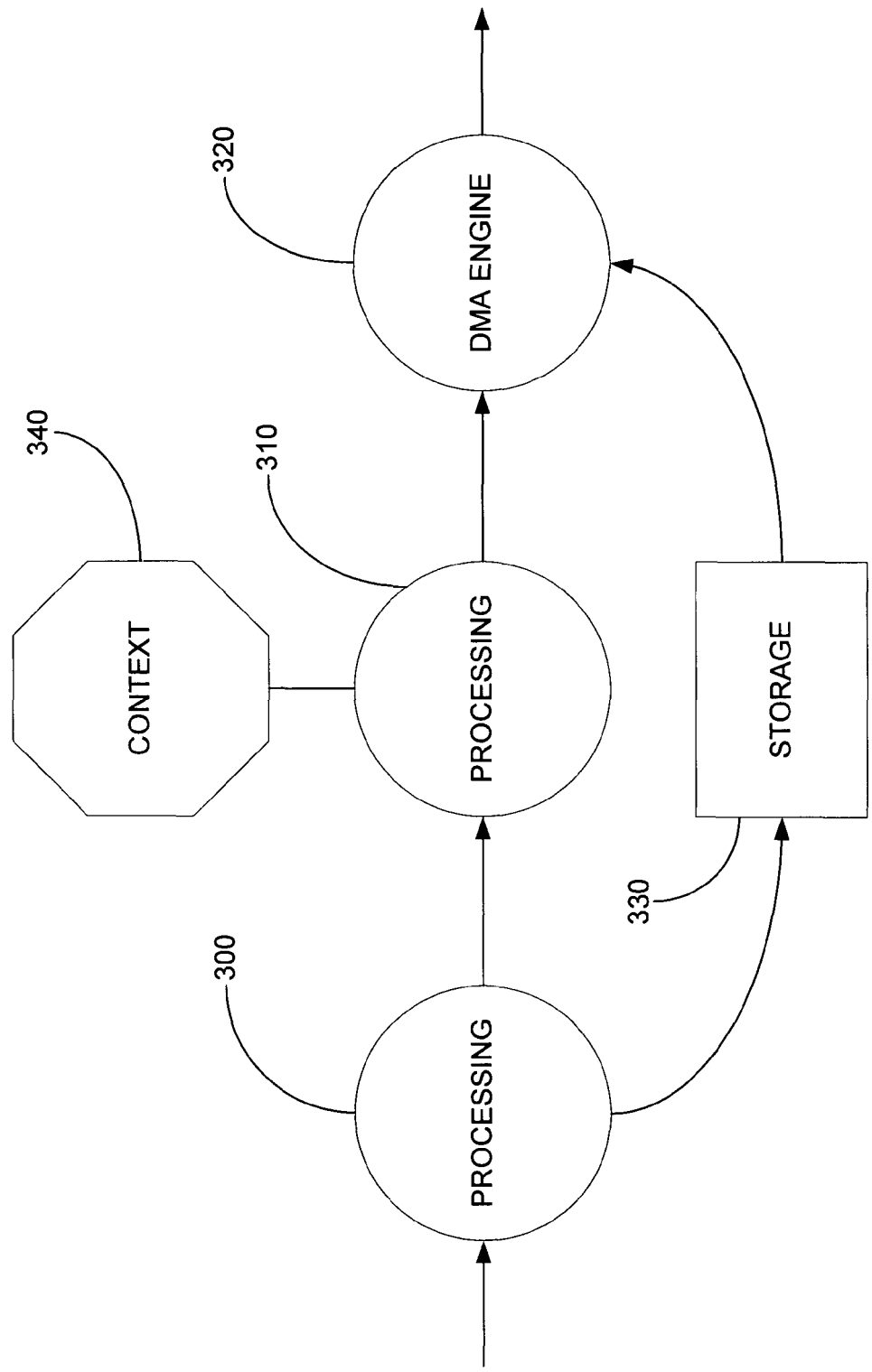
FIG. 12 is a block diagram, illustrating an exemplary embodiment of a receive system in accordance with an embodiment of the invention.
Figure 13:
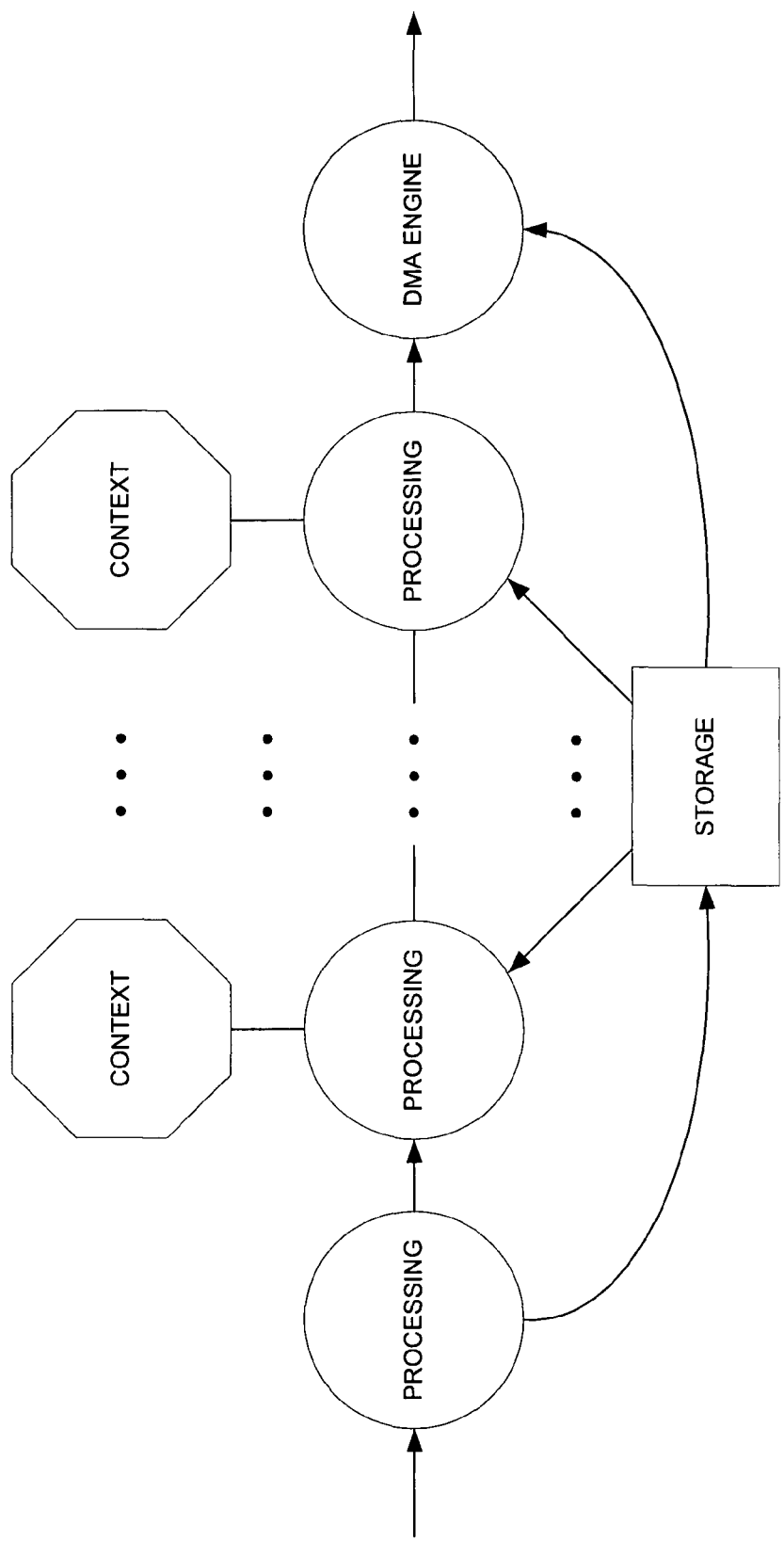
FIG. 13 is a block diagram illustrating an exemplary embodiment of a receive system in accordance with an embodiment of the invention.
Figure 14:
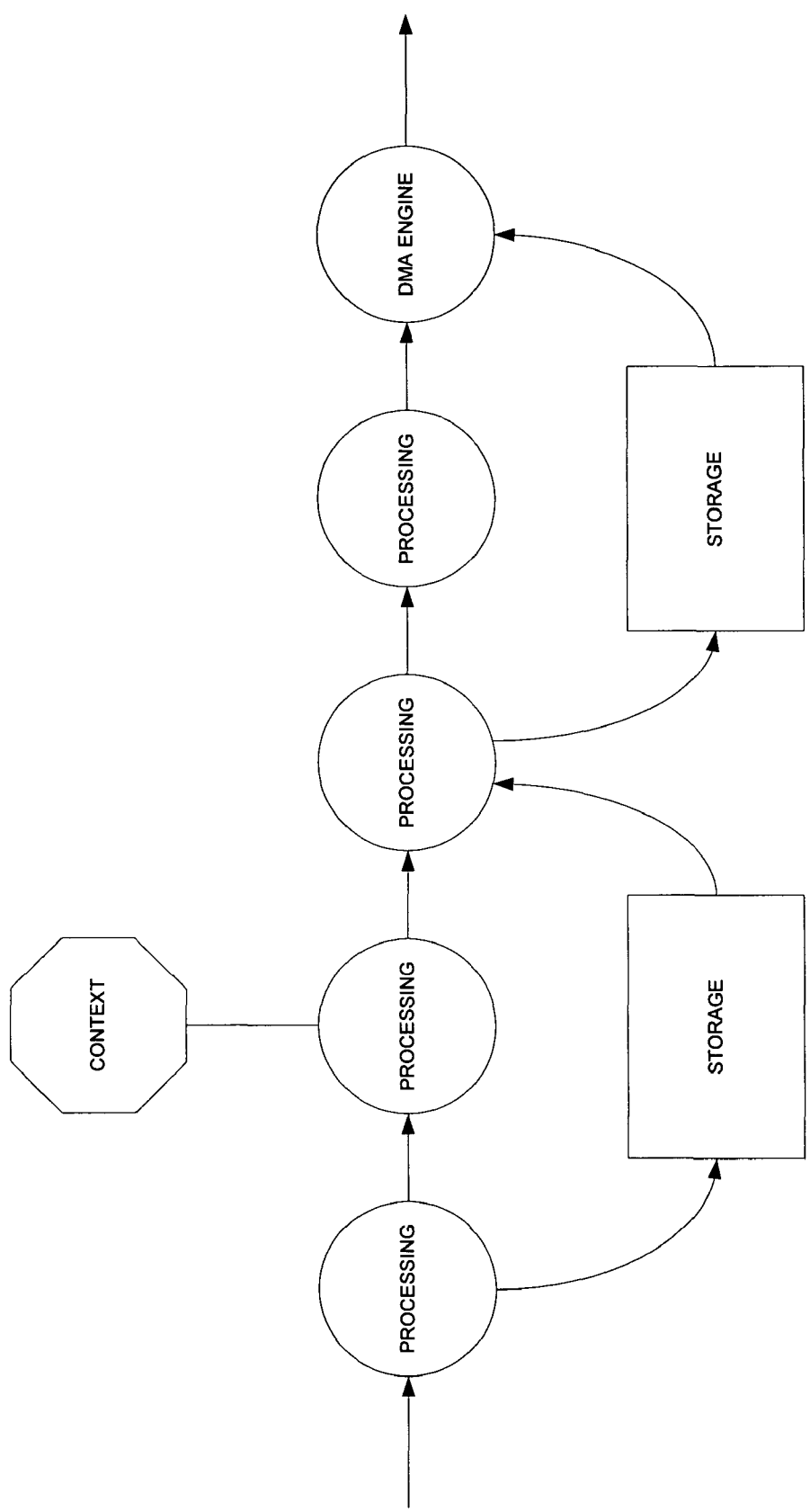
FIG. 14 is a block diagram illustrating an exemplary embodiment of a receive system in accordance with an embodiment of the invention.

FIG. 12, FIG. 13 and FIG. 14 are block diagrams illustrating embodiments of receive systems in accordance with an embodiment of the invention. Referring to FIGS. 12-14, in each illustrated embodiment, pipeline processing may be employed and information may be split into two paths: a control processing path and a data movement path. Referring to FIG. 12, the Ethernet may be coupled to the first processing element 300. The first processing element 300 may provide, for example, L1/L2 processing. Incoming information may be parsed and at least a portion of the incoming information may be directed to a control processing path via processing element 310 and DMA engine 320. Another portion of the incoming information, for example, payload data, may be directed to a data movement path via a storage element 330 and the DMA engine 320.

The processing element 310 may further process the received control information from the processing element 300. In one embodiment, the processing element 310 may be adapted to perform L4/L5 or higher processing. Context information tracked, for example, in local storage 340 may be accessed by the processing element 310. The processing element 310 may take context information tracked in local storage 340 and the control information received from the previous processing element 300 and process and combine the information before sending the combined information to the DMA engine 320. The DMA engine 320 may combine the control information from the control path and the data stored in the storage element 330 of the data path before directly storing the data or the combined information in one or more host buffers.

FIG. 13 and FIG. 14 also shows other multistage configurations according to the present invention. In particular, FIG. 13 shows a plurality of control processing stages, each with access to context information. Context information may comprise information about a TCP connection that pertains to the TCP connection state and generally includes connection state information that may be utilized to characterize the TCP connection. FIG. 14 shows a plurality of control processing stages and storage stages. Although shown with only a single context element in FIG. 14, more than one processing element may be coupled to a respective context element or a common context element. In other configurations, interstage processing elements may be coupled to a storage stage in which data may be a factor in the processing of the data and/or the control information corresponding to the data.

Figure 3:
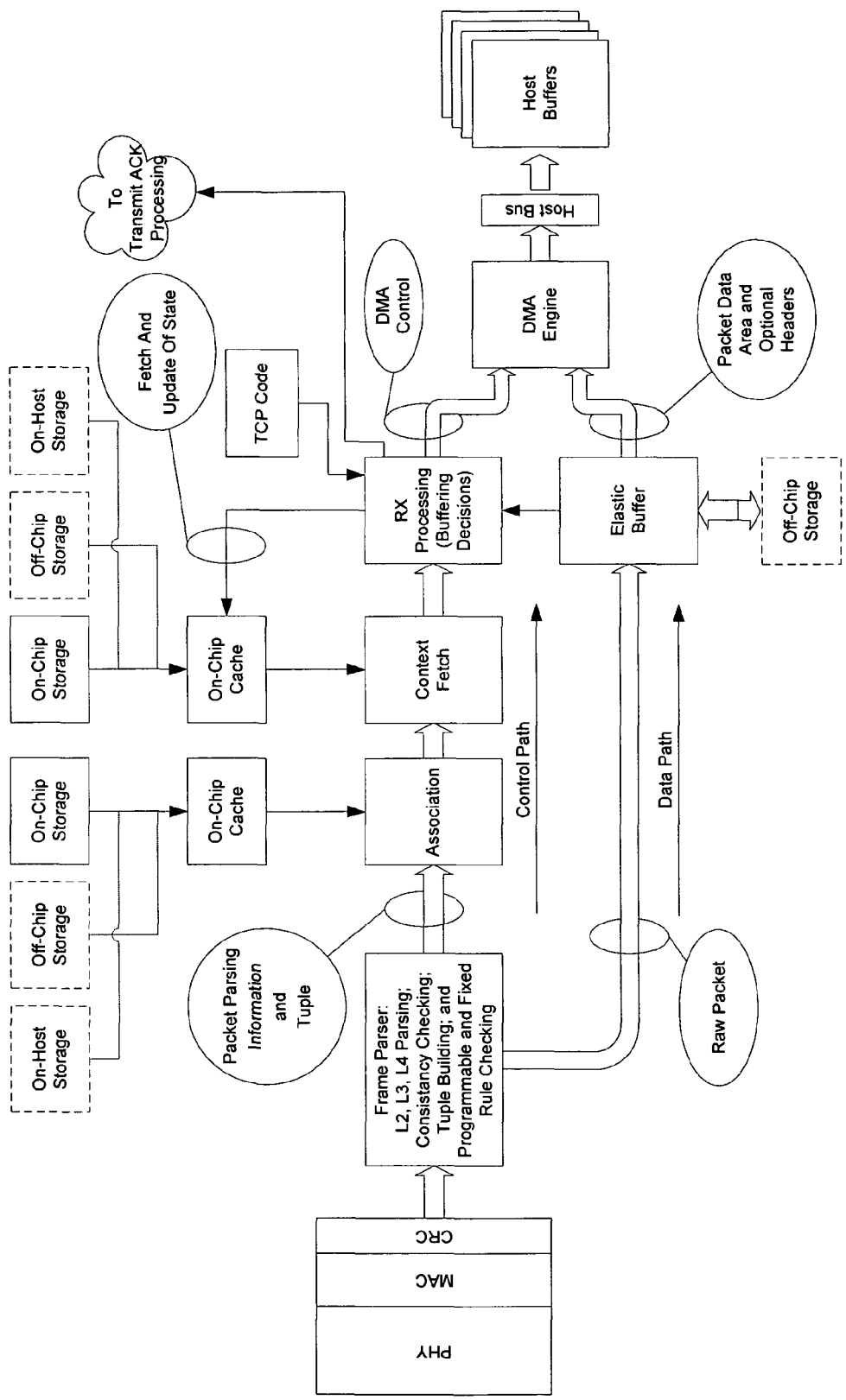
FIG. 3 illustrates an exemplary receive system for TCP offload system in accordance with an embodiment of the invention.

FIG. 3 illustrates an exemplary receive system for TCP offload system in accordance with an embodiment of the invention. The incoming frame may be subject to L2 such as Ethernet processing including, for example, address filtering, frame validity and error detection. Unlike an ordinary Ethernet controller, the next stage of processing may comprise, for example, L3 such as IP processing and L4 such as TCP processing. The TEEC may reduce the host CPU utilization and memory bandwidth, for example, by processing traffic on hardware offloaded TCP/IP connections. The TEEC may detect, for example, the protocol to which incoming packets belong. If the protocol is TCP, then the TEEC may detect if the packet corresponds to an offloaded TCP connection, for example, a connection for which at least some TCP state information may be kept by the TEEC. Once a connection has been associated with a packet or frame, any higher level of processing such as L5 or above may be achieved. If the packet corresponds to an offloaded connection, then the TEEC may direct data movement of the data payload portion(s) of the frame. The destination of the payload data may be determined from the connection state information in combination with direction information within the frame. The destination may be a host memory, for example. Finally, the TEEC may update its internal TCP and higher levels of connection state and may obtain the host buffer address and length from its internal connection state.

The receive system architecture may comprise, for example, a control path processing and data movement engine. The system components above the control path as illustrated in upper portion of FIG. 3, may be designed to deal with the various processing stages used to complete, for example, the L3/L4 or higher processing with maximal flexibility and efficiency and targeting wire speed. The result of the stages of processing may comprise, for example, one or more packet identification cards (PID_Cs) that may provide a control structure that may carry information associated with the frame payload data. This may have been generated inside the TEEC while processing the packet in the various blocks. A data movement system as illustrated in the lower portion of FIG. 3, may move the payload data portions of a frame along from, for example, an on-chip packet buffer and upon control processing completion, to a direct memory access (DMA) engine and subsequently to the host buffer that was chosen via processing.

The receiving system may perform, for example, one or more of the following: parsing the TCP/IP headers; associating the frame with an end-to-end TCP/IP connection; fetching the TCP connection context; processing the TCP/IP headers; determining header/data boundaries; mapping the data to a host buffer(s); and transferring the data via a DMA engine into these buffer(s). The headers may be consumed on chip or transferred to the host via the DMA engine.

The packet buffer is a block in the receive system architecture. It may be utilized for the same purpose as, for example, a first-in-first-out (FIFO) data structure is used in a conventional L2 NIC or for storing higher layer traffic for additional processing.

The packet buffer in the receive system may not be limited to a single instance. As control path processing is performed, the data path may store the data between data processing stages one or more times depending, for example, on protocol requirements.

Figure 4:
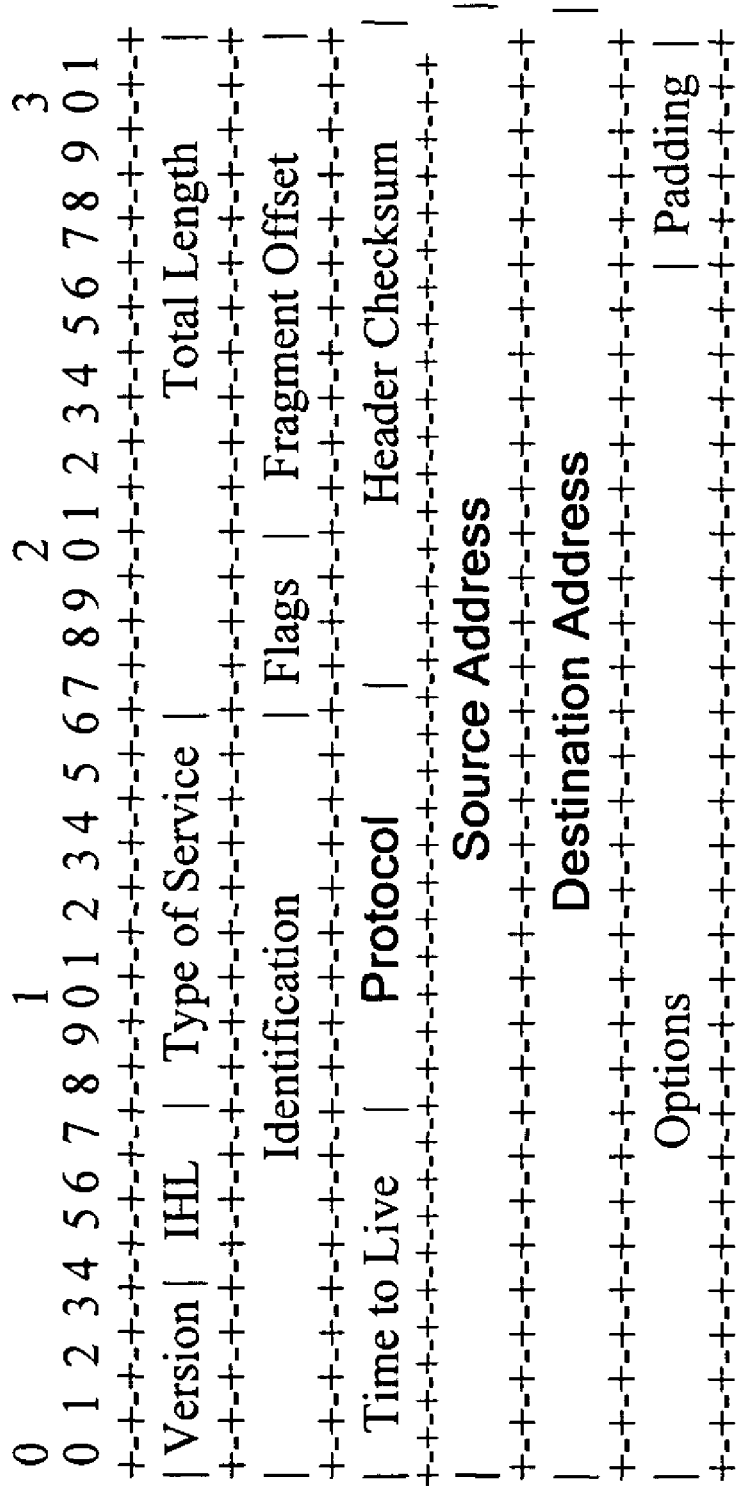
FIG. 4 illustrates IP datagram headers for IPv4 in accordance with an embodiment of the invention.
Figure 5:
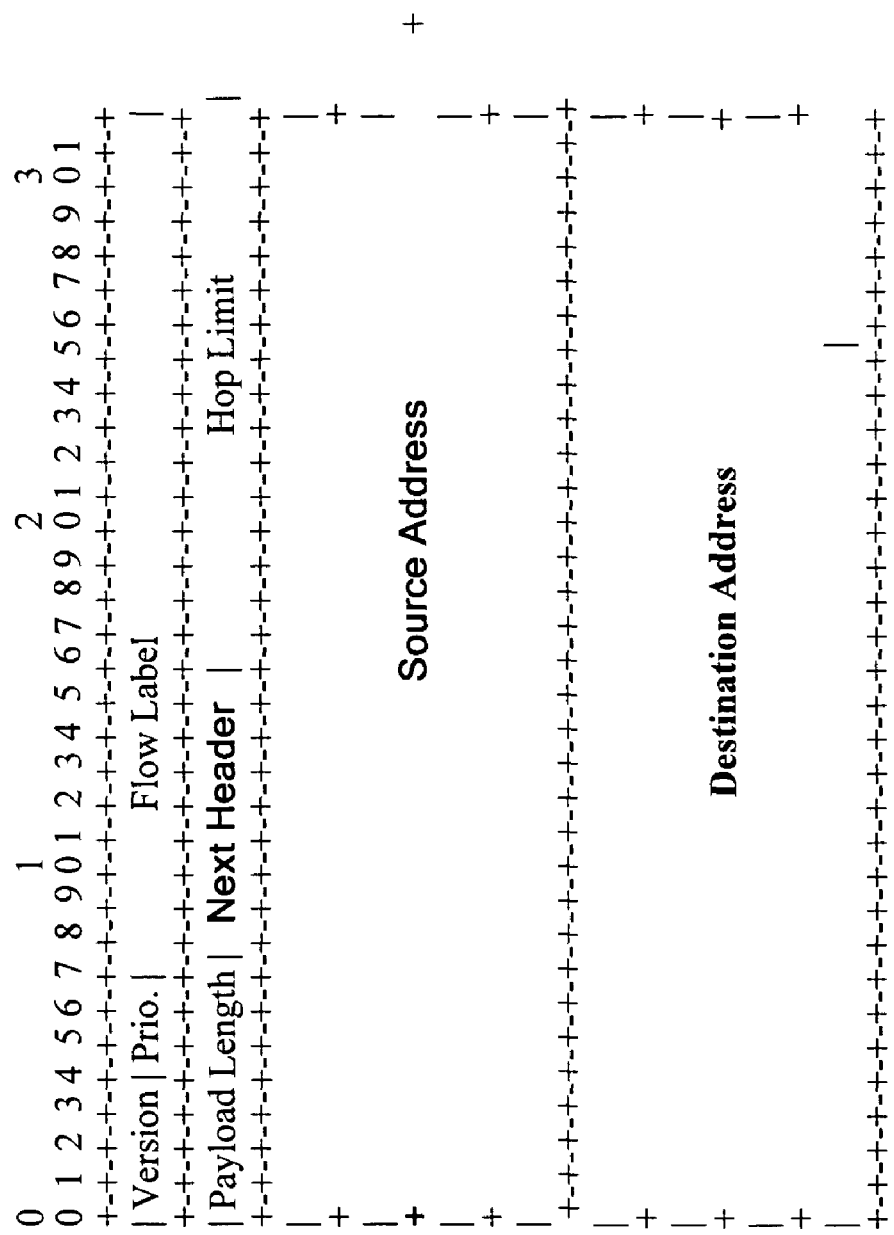
FIG. 5 illustrates IP datagram headers for IPv6 in accordance with an embodiment of the invention.
Figure 11:
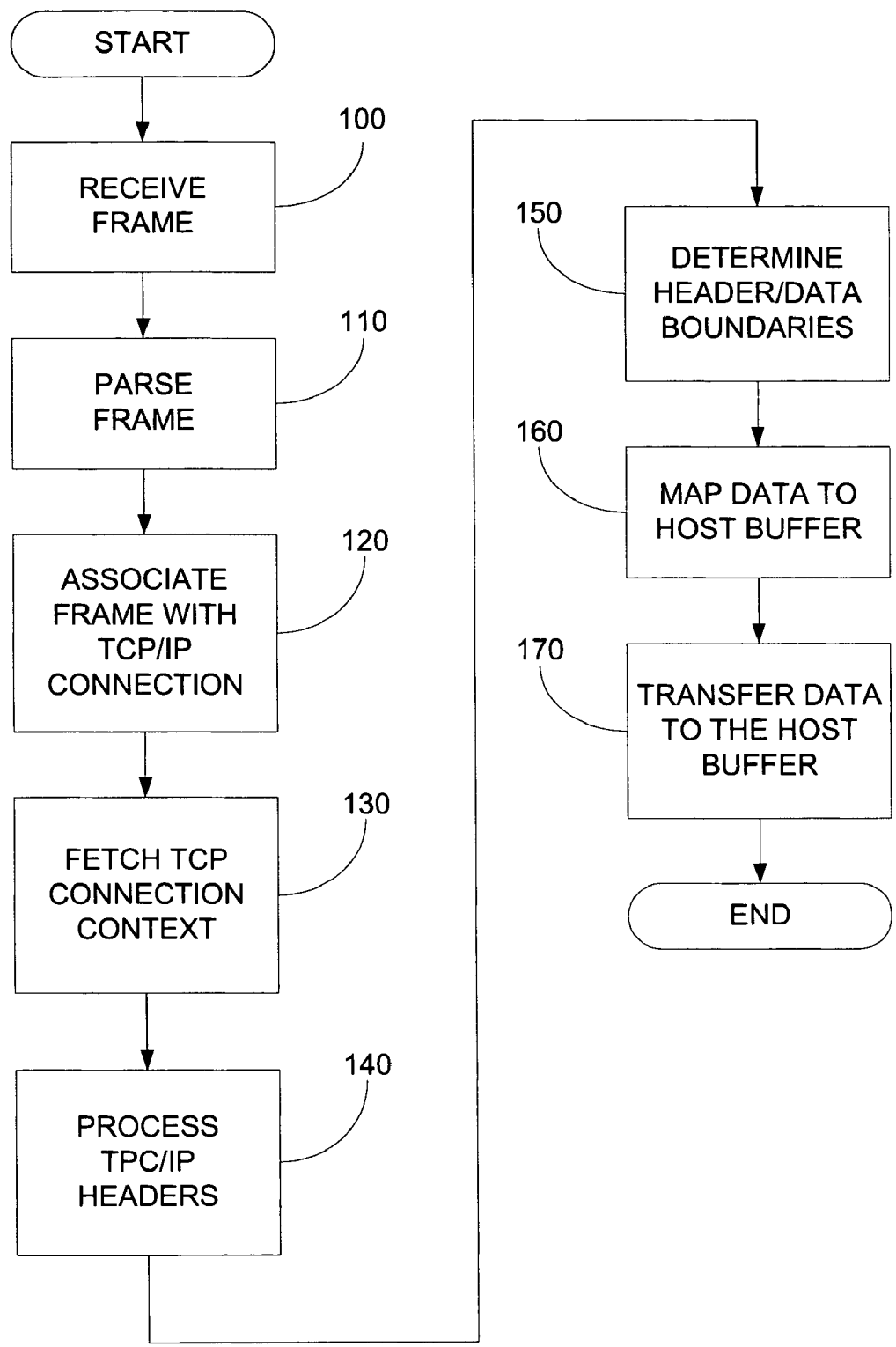
FIG. 11 is a flowchart illustrating exemplary steps for frame reception in accordance with an embodiment of the invention.

FIG. 11 is a flowchart illustrating exemplary steps for frame reception in accordance with an embodiment of the invention. Referring to FIG. 3 and FIG. 11, in step 100, the NIC 50 may receive a frame from, for example, the Ethernet 60. In step 110, the frame parser may parse the frame, for example, to find the L3 and L4 headers. The frame parser may process the L2 headers leading up to the L3 header, for example IP version 4 (IPv4) header or IP version 6 (IPv6) header. The IP header version field may determine whether the frame carries an IPv4 datagram or an IPv6 datagram. FIG. 4 illustrates IP datagram headers for IPv4 in accordance with an embodiment of the invention. FIG. 5 illustrates IP datagram headers for IPv6 in accordance with an embodiment of the invention. For example, if the IP header version field carries a value of 4, then the frame may carry an IPv4 datagram. If, for example, the IP header version field carries a value of 6, then the frame may carry an IPv6 datagram. The IP header fields may be extracted, thereby obtaining, for example, the IP source (IP SRC) address, the IP destination (IP DST) address, and the IPv4 header "Protocol" field or the IPv6 "Next Header". If the IPv4 "Protocol" header field or the IPv6 "Next Header" header field carries a value of 6, then the following header may be a TCP header. The results of the parsing are added to the PID_C and the PID_C travels with the packet inside the TEEC.

Figure 6:
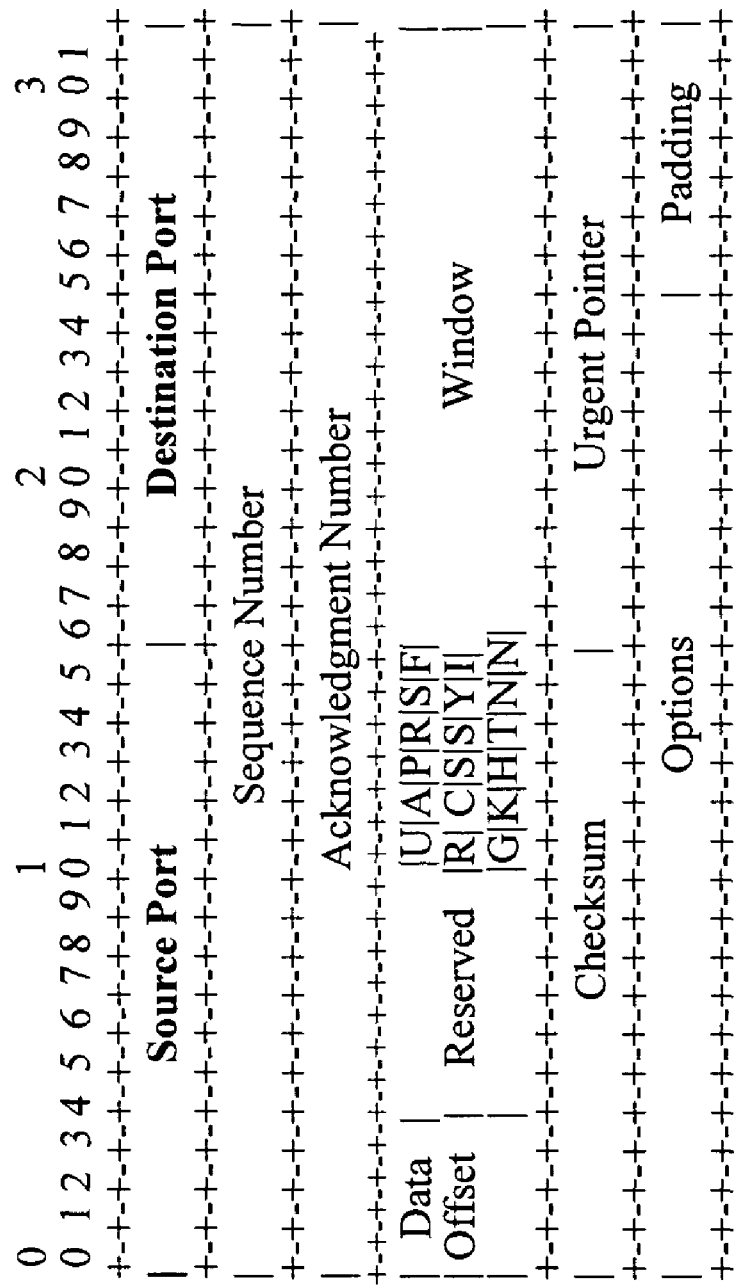
FIG. 6 is an embodiment of a TCP header format in accordance with the invention.

The rest of the IP processing may subsequently take place later in a manner similar to the processing in a conventional off-the-shelf software stack. Implementation may vary from the use of firmware on an embedded processor to a dedicated, finite state machine, which may be potentially faster, or a hybrid of a processor and a state machine. The implementation may vary with, for example, multiple stages of processing by one or more processors, state machines, or hybrids. The IP processing may comprise, for example, extracting information relating to, for example, length, validity, fragmentation, etc. The located TCP header may also be parsed and processed. FIG. 6 is a diagram illustrating a TCP header format in accordance with an embodiment of the invention. The parsing of the TCP header may extract information relating to, for example, the source port and the destination port.

The TCP processing may be divided into a plurality of additional processing stages. In step 120, the frame may be associated with an end-to-end TCP/IP connection. After L2 processing, in one embodiment, the present invention may provides that the TCP checksum be verified. The end-to-end connection may be uniquely defined by, for example, the following 5 tuple: IP Source address (IP SRC addr); IP destination address (IP DST addr); L4 protocol above the IP protocol (e.g., TCP, UDP or other upper layer protocol); TCP source port number (TCP SRC); and TCP destination port number (TCP DST). The process may be applicable for IPv4 or IPv6 with the choice of the relevant IP address.

As a result of the frame parsing in step 110, the 5 tuple may be completely extracted and may be available inside the PID_C. Association hardware may compare the received 5 tuple with a list of 5 tuples stored in the TEEC. The TEEC may maintain a list of tuples representing, for example, previously handled off-loaded connections or off-loaded connections being managed by the TEEC. The memory resources used for storing the association information may be costly for on-chip and off-chip options. Therefore, it is possible that not all of the association information may be housed on chip. A cache may be used to store the most active connections on chip. If a match is found, then the TEEC may be managing the particular TCP/IP connection with the matching 5 tuple.

Figure 7:
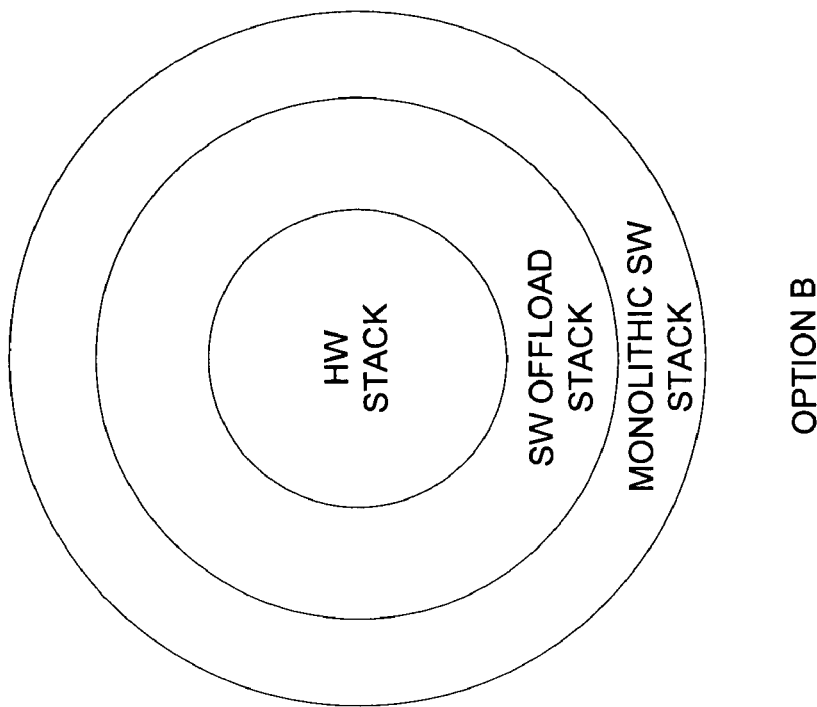
FIG. 7 illustrates exemplary payload options in accordance with an embodiment of the invention.
Figure 7:
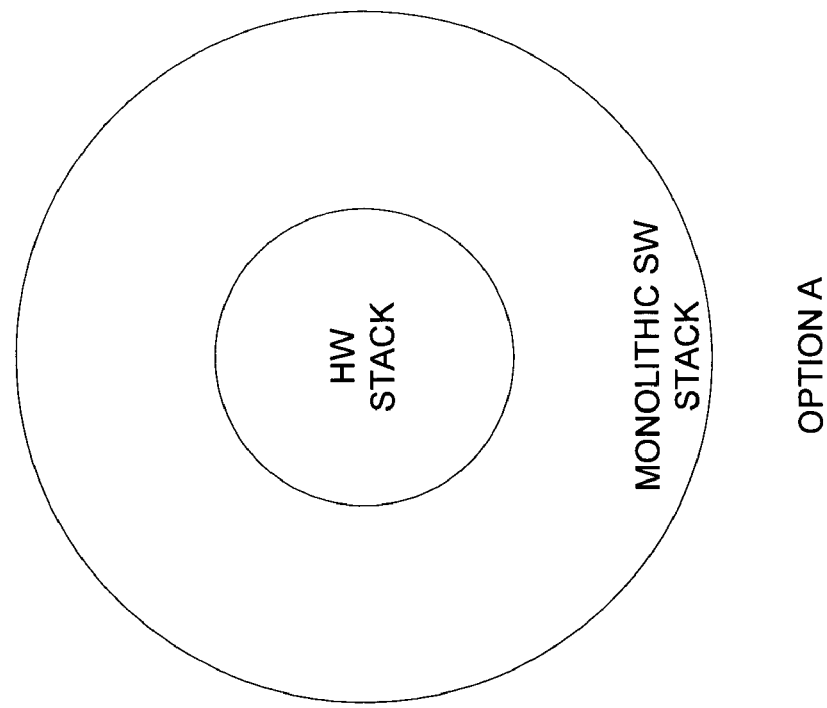

FIG. 7 illustrates exemplary payload options in accordance with an embodiment of the invention. In case of a mismatch, the TCP connection may be managed based upon, for example, one or more offload policy options, embodiments of which are illustrated in FIG. 7 in accordance with the invention.

The TCP processing implementation may vary from the use of firmware on an embedded processor to a dedicated, finite state machine, which may be potentially faster, or a hybrid of a processor and a state machine. The implementation may vary with multiple stages of processing by one or more processors, state machines or hybrids. The TCP processing may comprise, for example, extracting information relating to, for example, length, validity, fragmentation, etc. The located TCP header may also be parsed and processed. FIG. 6 is an embodiment of a TCP header format in accordance with the invention.

Any higher levels of processing such as L5 and above, may take place later in a manner similar to the processing in a conventional off-the-shelf software stack. Implementation may vary from the use of firmware on an embedded processor to a dedicated, finite state machine, which may be potentially faster, or a hybrid of a processor and a state machine. The implementation may vary with multiple stages of processing by one or more processors, state machines or hybrids. The higher level processing may comprise, for example, extracting security, placement and buffer management information relating to, for example, the frame. The higher level processing is not limited to these operations.

Referring to FIG. 7, option A comprises a monolithic software stack and a hardware stack. The hardware stack provides, for example, normal L2 frame processing for all frames that are handled by the hardware stack and those managed by the monolithic software stack. The hardware stack provides, for example, higher layer offload services to some connections while the monolithic software stack provides, for example, higher layer offload servers to other connections. In case of a mismatch, the hardware may assume that the monolithic software stack manages the connection. However, this need not preclude the keeping of statistics relating to the particular TCP connection within, for example, the TEEC or with the software driver on the suitability of the connection for future offload from the monolithic software stack to the hardware stack. A background task may take the most used connections and push them into the offload state on the hardware stack.

Also referring to FIG. 7, option B comprises a monolithic software stack, a software offload stack and a hardware stack. The hardware stack provides, for example, normal L2 frame processing for all frames that are handled by the hardware stack and those managed by any software stack. The hardware stack provides, for example, higher layer offload services to some connections. The software offload stack provides, for example, higher layer offload services to another set of connections while the monolithic software stack provides, for example, higher layer offload services to yet another set of connections. In case of a mismatch in the hardware stack, the hardware further checks to see whether the software offload stack may be managing the connection. In the case in which the software offload stack is managing the connection, the frame may be forwarded to the software offload stack that may process the connection while maintaining data structures in readiness for hardware offload. Statistics may still be maintained on these connections. If a connection is determined to be of high use, then it may be directly offloaded to hardware. If the software offload stack is incapable of processing the connection, then it may be delivered to the monolithic software stack. The software offload stack may process the frame just as the hardware stack. Therefore, from the perspective of the monolithic software stack, the combination of the hardware stack and the software offload stack may handle all the connections it has off-loaded.

Figure 8A:
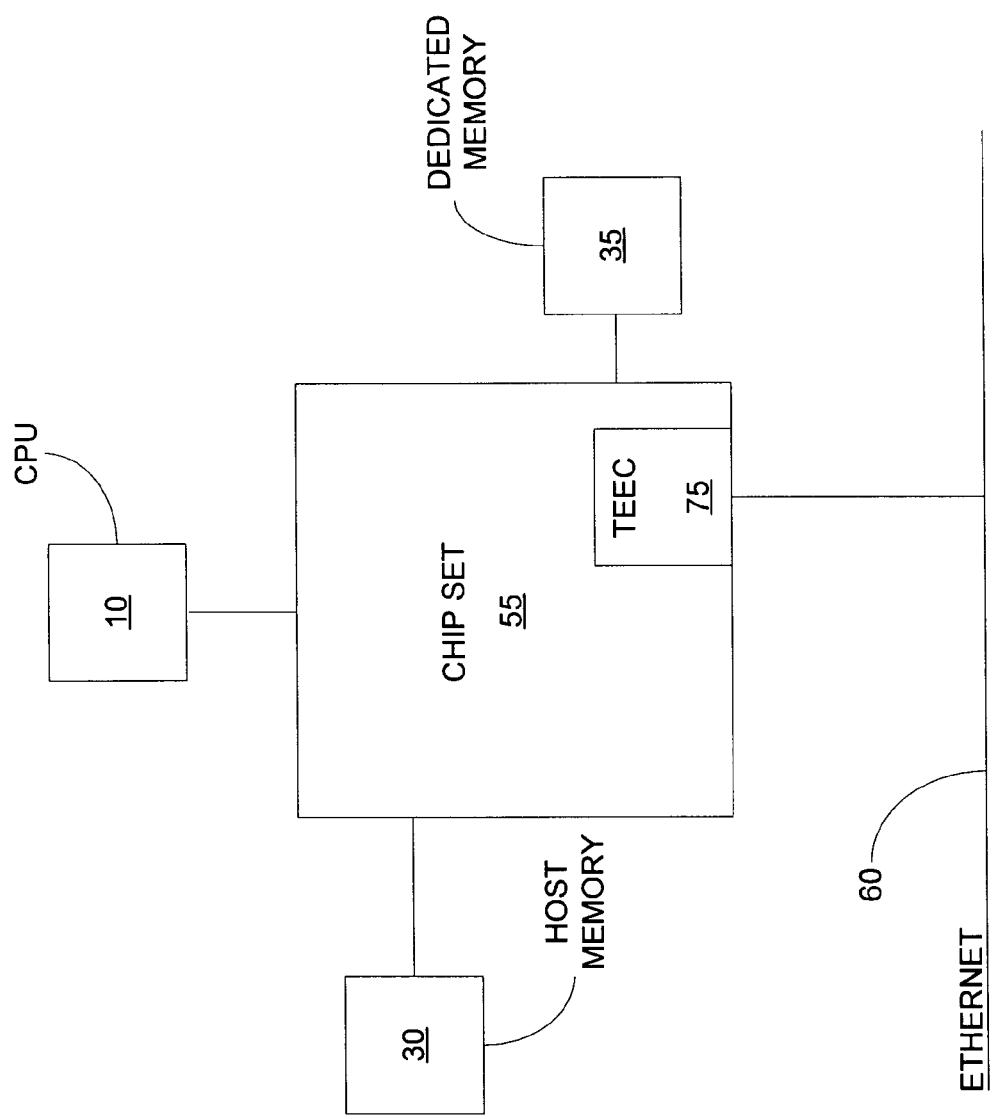
FIG. 8A illustrates and exemplary chip set in which a TEEC is a single chip or part of a single chip.
Figure 8B:
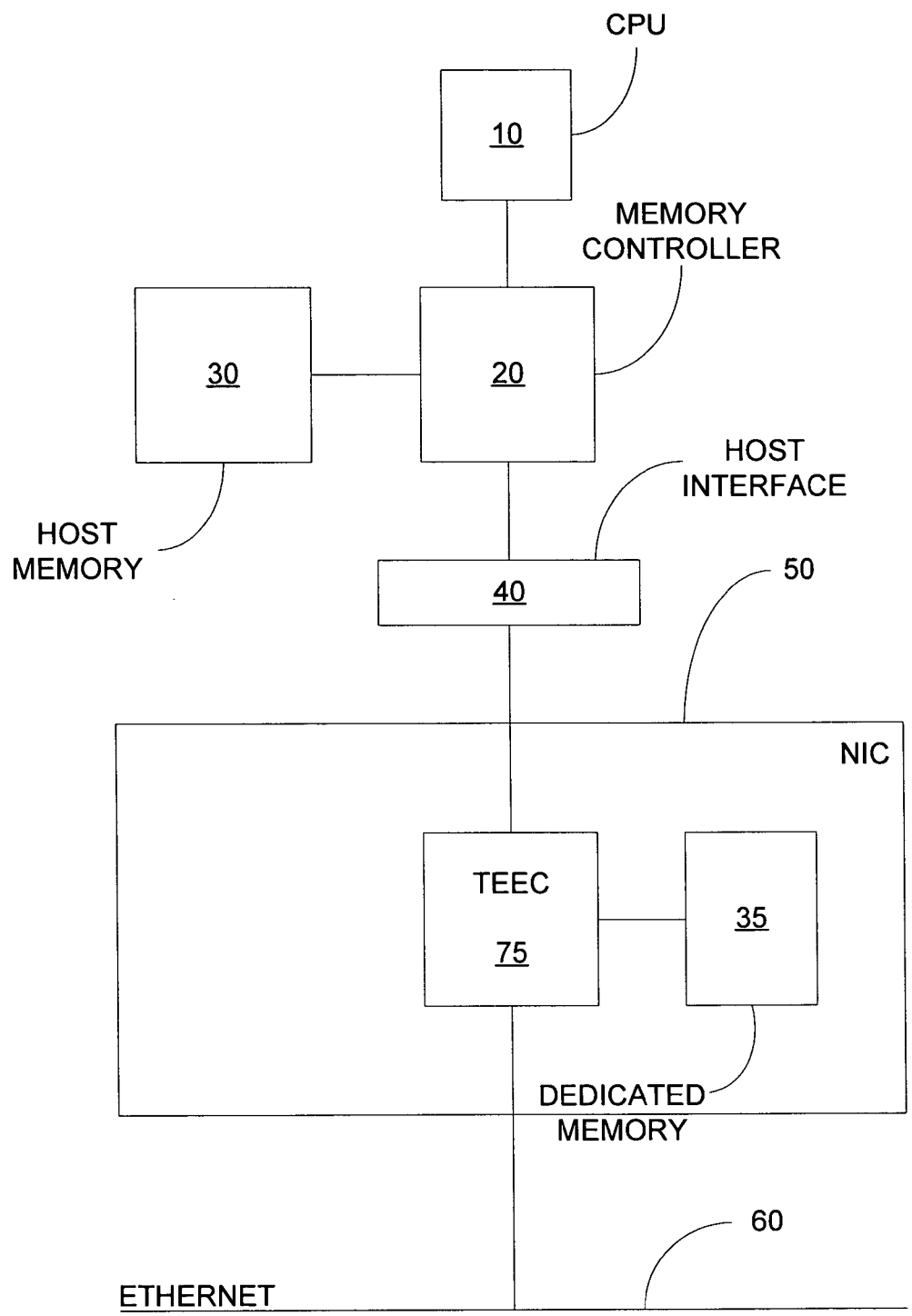
FIG. 8B illustrates a NIC including, for example, the TEEC of FIG. 8A and the dedicated tuple and/or context memory in accordance with an embodiment of the invention.

In step 130, TCP connection context may be fetched from, for example, a context memory. The context information may comprise, for example, TCP variables utilized to process the frame and the buffer information in the host where the data is to be stored. FIGS. 8A-B illustrated exemplary embodiments of some storage locations of tuple and/or context information according to the present invention. In addition to on-chip memory, external memory resources may be used to expand capacity.

FIG. 8A illustrates and exemplary chip set in which a TEEC is a single chip or part of a single chip. The TEEC 75 may fetch tuple and/or context information from a tuple and/or context buffer located in the host memory 30. The TEEC 75 may also fetch tuple and/or context information from a dedicated tuple and/or context memory 35 which is coupled to the chip set 55.

FIG. 8B illustrates a NIC including, for example, the TEEC of FIG. 8A and the dedicated tuple and/or context memory in accordance with an embodiment of the invention. The TEEC 75 may fetch tuple and/or context information from a tuple and/or context buffer located in the host memory 30. The TEEC 75 may also fetch tuple and/or context information from the dedicated tuple and/or context memory 35, which may also be on the NIC 50 and be coupled to the TEEC 75.

In step 140, the TCP/IP headers may be processed. Some IP and TCP frame validity checks, for example, IPv4 header checksum, and TCP checksum, may be performed along with data movement from the frame parser to the frame buffer. Results may be registered inside the PID_C. The TCP/IP headers, the context fetched from the context memory and the information generated thus far in the PID_C may be provided to the receiver processing block, which may comprise one or more processors and/or finite state machines. The receiver processing block may utilize, for example, the context information to complete additional TCP/IP processing for the frame including, for example, updating TCP state variables or resetting timers as set forth in RFC 793. The receiver processing block may also use the partial results provided by the frame parser and the association block that may have previously been stored in the PID_C. If processing is completed with no errors, then the data may be mapped into the host buffer for storage. The receiver processing block may signal the transmitter side for future transmission of TCP acknowledgements for the connection after the data has been successfully stored in the host memory buffer.

In step 150, the header/data boundaries may be determined. The results of the processing in the control path may determine the boundaries between the packet portions that are treated as headers and the packet portions that are treated as data or payload. Although the data may be moved to a host buffer, the headers may be consumed by the TEEC or may be moved to a separate host buffer for statistics, debug or further processing.

In step 160, the data inside the received packet belonging to a particular 5 tuple connection may be mapped to the host resident buffer(s) allocated for that particular connection.

Figure 9:
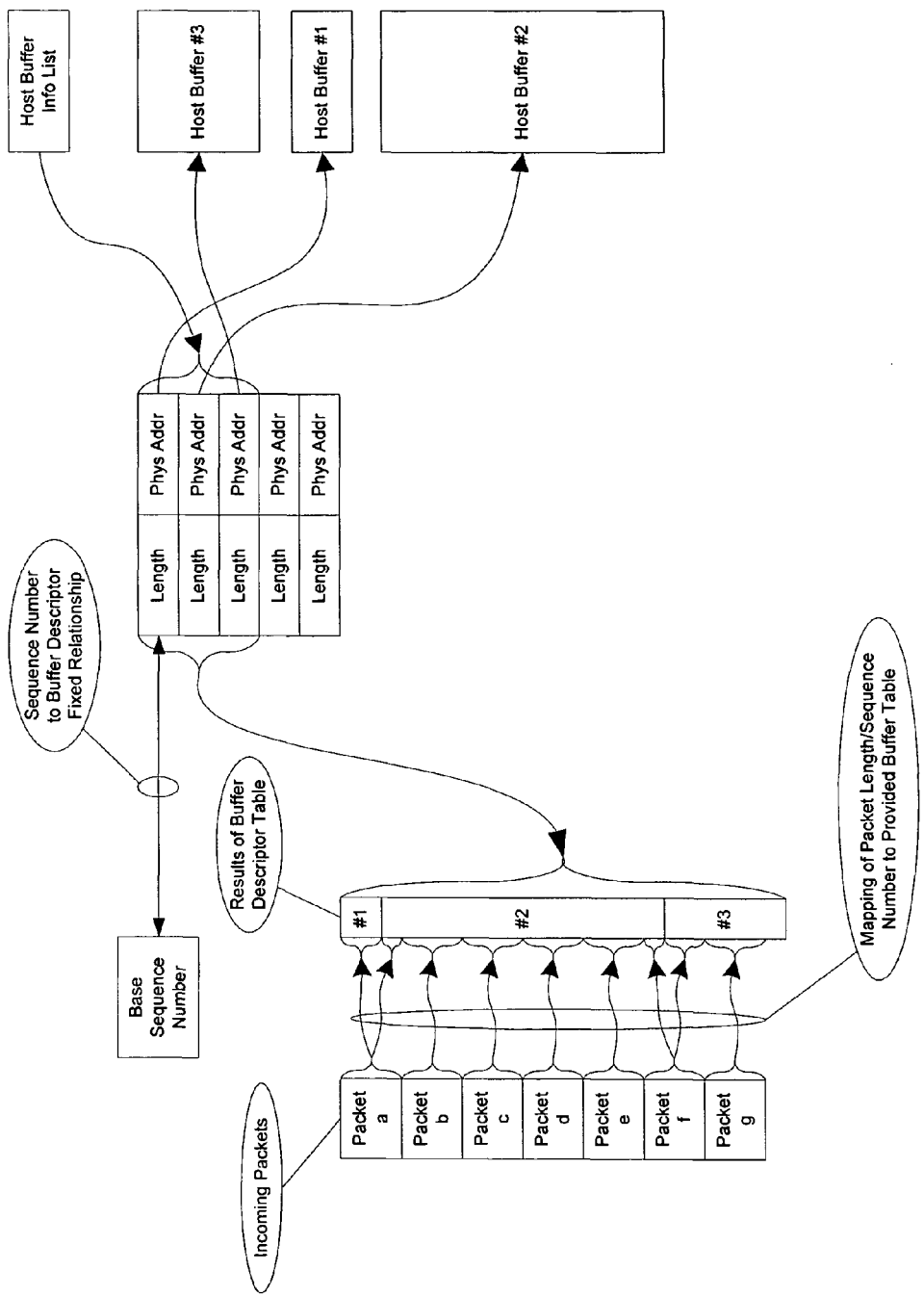
FIG. 9 illustrates an embodiment of a system that may map and copy data of an incoming packet to a host resident buffer or buffers in accordance with an embodiment of the invention.

The allocated buffers may have been pre-allocated by an application or a protocol processing layer (e.g., a TCP layer). In one example, the allocated buffers are temporary buffers. FIG. 9 illustrates an embodiment of a system that may map and copy data of an incoming packet to a host resident buffer or buffers in accordance with an embodiment of the invention. In one example, the TEEC may copy the data directly into the host buffer with no need to initially keep the data locally on the NIC.

The host may describe the buffers by using a list structure that describes each buffer with, for example, a physical address in host memory and a length in bytes. The host may also describe the buffers in other manners such as, for example, via a page table structure. The TEEC may read the buffer information and may construct a mapping between TCP sequence numbers of the incoming packets and the host buffers. A particular TCP sequence number may be mapped, for example, to the start of a specific buffer or into some offset into a specific buffer. The mapping may be initialized when a buffer is assigned to an offloaded connection. As packets are received, they are compared to the buffer mapping information based upon, for example, length and the TCP sequence number. Based upon the comparison, one packet may be mapped into one or more buffers. In turn, one or more instructions may be generated to the DMA engine to move the packet data into the host buffer or buffers.

The TEEC may map the TCP sequence number, which may be carried in the TCP header of the packet, of the first payload byte to an offset inside the host resident buffers provided to the TEEC. In step 170, the TEEC may deposit the TCP segment data directly into the host buffers, for example, TCP buffers, pre-posted application buffers. TCP data may be, for example, reassembled in the host memory without keeping a local copy on the TEEC. It may also save on copying the data on the host, saving precious CPU cycles and preserving bandwidth in the memory subsystem. In this regard, zero-copy operation may be supported.

When the TCP connection is offloaded to the TEEC, it may comprise, for example, an anchor such as a mapping of RCV_NXT, the TCP sequence number of the next expected byte, to a specific host address expressed as a base and offset within a buffer. The variable RCV_NXT is adjusted each time more bytes are accepted by TCP for reception. The buffer address corresponding to RCV_NXT is Buffer[I].NXT_addr and it is adjusted to point to the first byte available in the first buffer. When a buffer is added to the tail of an existing list, the maximum size of the available buffer is adjusted. When a buffer is completely consumed, the buffer is returned to the host for consumption by the buffer owner. When a buffer is returned to the host because a PUSH bit has been set in an incoming TCP segment, the mapping of RCV_NXT is adjusted to point to the first byte of the next buffer. This activity may be repeated each time the list is exhausted and a new buffer is allocated to the offloaded TCP connection.

A connection may be first offloaded and a buffer may be allocated later. The process of mapping any TCP segment into the host buffer may begin with computing a delta (e.g., a difference) between its TCP sequence number and RCV_NXT number. The delta may then be added to the base and offset into the first buffer (i.e., Buffer[I].NXT_addr). If the delta extends beyond the length of the first buffer, then the length of the second buffer is added. This may continue until the buffer into which the TCP Sequence number maps are found. The computation may take into account, for example, variable sizes of the pre-posted buffers. The TEEC may then determine whether the identified buffer has enough memory for the whole TCP segment or whether the TCP segment may spill over into the next buffer. In light of the determinations and computations, a series of DMA commands are generated with offset into the TCP segment received, host address and length. When the data in the frame should be stored inside a buffer that may be beyond the end of the current list owned by the TEEC, the TEEC may either drop the frame and not acknowledge it to the peer TCP or store it temporarily until it can get another buffer from the host.

For TCP segment received, one or more of the process steps may be executed as set forth below. In one embodiment, the operations on the TCP sequence space may be mod32 as the TCP Sequence space wraps around every $2^{32}-1$ bytes. However, other moduli arithmetic may be implemented.

The below-listed pseudo code describes an embodiment of a process that moves data from the TCP segment to the buffer list according to the present invention. For simplicity, the code handling the PUSH bit or the no room in current buffer list has been omitted.

```
1.      /* The TCP Sequence number range (TCP Seq # of the first
byte of TCP payload, TCP Sequence # of last byte) is checked to be
within RCV window (between RCV_NXT and RCV_NXT +
TCP_Window) */
1A.     /* If duplicate frame (all bytes have been received before)
drop the frame */
 if TCP_Sequence # of last Byte < RCV_NXT then drop_frame;
1B.     check that RCV_NXT < TCP_Sequence # of first Byte <
(RCV_NXT + TCP_window)
1C.     check that RCV_NXT < TCP_Sequence # of last Byte <
(RCV_NXT + TCP_window)
1D.     /* If some bytes have been received before ignore duplicate
bytes */
 if TCP_Sequence # of first Byte < RCV_NXT then TCP_Sequence #
of first Byte = RCV_NXT;
2.      /* Find the right entry in the buffer list */
        Segment_Length = TCP Sequence # of last byte of TCP payload -
TCP Sequence # of first byte;
        /* Delta holds the difference in the TCP sequence number to the
location first byte of the frame. It is also the distance in the buffer space
to
the first byte that ought to used to store it */
        Delta = (TCP_Sequence # of first
Byte - RCV_NXTfrom context) /*
delta from anchor */
        i=0; /* used to dynamically point to the buffer that corresponds to
RCV_NXT*/
        */ some bytes of Host_Buffer_List.Buffer[0] may have been used
already. Need to figure out how many are left */
        if (Delta < (Host_Buffer_List.Buffer[0].length -
(Host_Buffer_List.Buffer[0].NXT_Addr -
Host_Buffer_List.Buffer[0].Phy_Addr)))
        {
          Delta + = (Host_Buffer_List.Buffer[0].NXT_Addr -
Host_Buffer_List.Buffer[0].Phy_Addr);
        }
        else
        {
 Delta -= (Host_Buffer_List.Buffer[0].length -
(Host_Buffer_List.Buffer[0].NXT_Addr -
Host_Buffer_List.Buffer[0].Phy_Addr));
5.      Do while { Delta - Host_Buffer_List.Buffer[i].length > 0}
        {
          Delta -= Host_Buffer_List.Buffer[i].length;
          i++;
        }
        i--;
        }
6.      /* The variable i points to the i^th buffer after the first buffer,
where data posting should start at. Delta holds the offset into
this buffer */
7.      Bytes_to_DMA = Segment_length;
```

-continued

```
8.      /* DMA into first buffer, syntax of DMA_Data (from
address, to address, length) */
        DMA_Data ( TCP Sequence of first byte,
Host_Buffer_List.Buffer[i].Phy_Address+ Delta,
Host_Buffer_List.Buffer[i].length-Delta)
10.     /* is_buffer_full has the following syntax (first_byte_written,
length) and returns 1 in case it is full */
     if (buff_full = is_buffer_Full(Host_Buffer_List.Buffer[i].
Phy_Address+ Delta, Host_Buffer_List.Buffer[i].length-Delta) ) then
return_buffer_to_owner( );
11.     Bytes_to_DMA -= Host_Buffer_List.Buffer[i].length-Delta;
/* bytes that have been DMA'd into 1st buffer */
12.     Start_TCP_Seq = TCP Sequence of first byte +
(Host_Buffer_List.Buffer[i].length-Delta);
        /* DMA into next buffers if needed */
13.     Do while {Bytes_to_DMA > 0}
14.     {
        if (Bytes_to_DMA > Host_Buffer_List.
        Buffer[i].Length) DMA data
(Start_TCP_Seq, Host_Buffer_List.Buffer[i].Phy_Address,
Host_Buffer_List.Buffer[i].Length)
        else DMA data (Start_TCP_Seq,
Host_Buffer_List.Buffer[i].Phy_Address, Bytes_to_DMA);
        Bytes_to_DMA -= Host_Buffer_List.Buffer[i].length;
        Start_TCP_Seq += Host_Buffer_List.Buffer[i].length
        i++;
        If i > max_buffers then goto no_more_buffers;
}
```

The base sequence number and the host buffer information list may be updated as buffers are consumed along with the movement of the TCP Window to the right.

Figure 10:
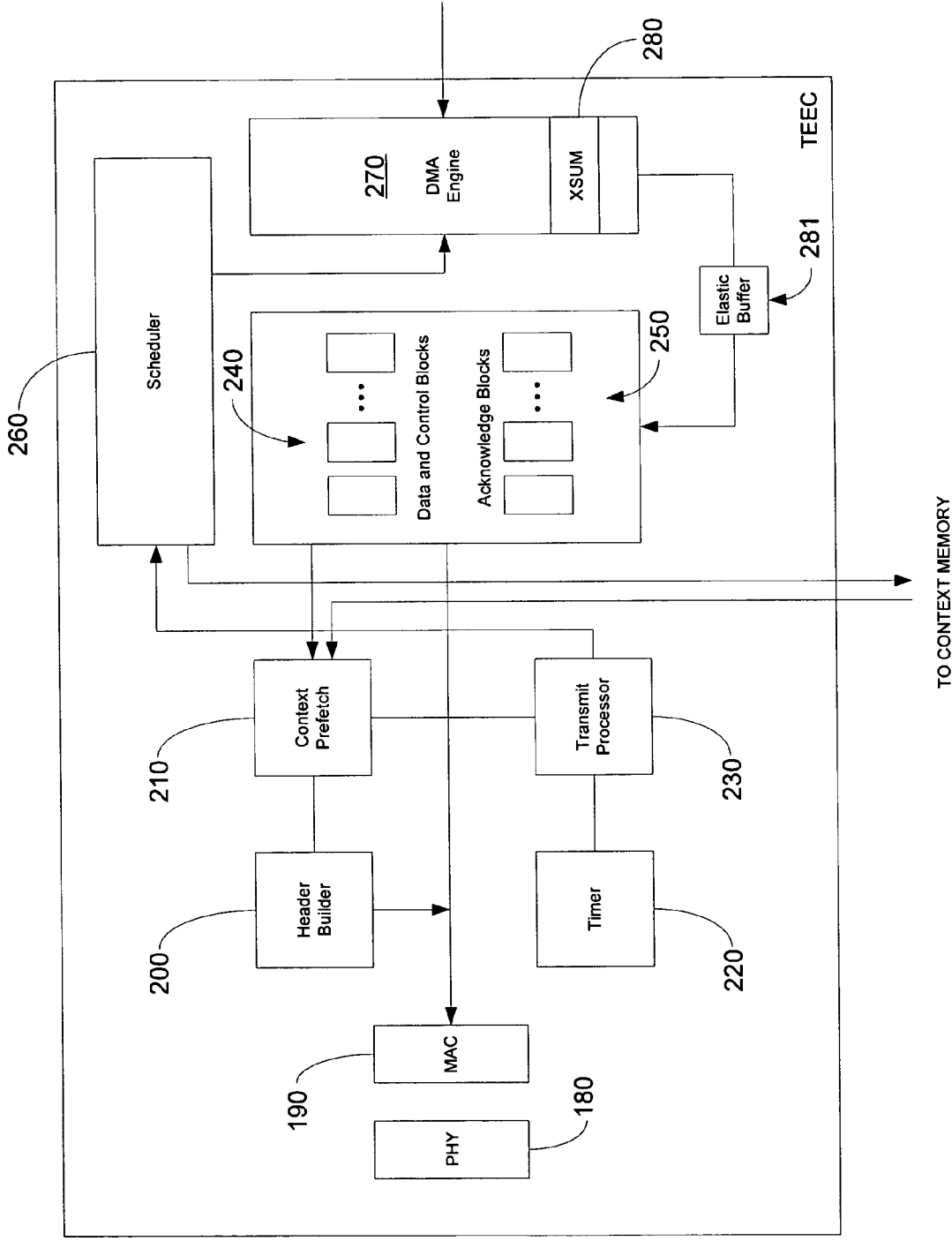
FIG. 10 illustrates an exemplary transmission path in accordance with an embodiment of the invention.

FIG. 10 illustrates an exemplary transmission path in accordance with an embodiment of the invention. The TEEC may comprise, for example, a physical layer (PHY) 180, a MAC layer 190, a header builder 200, a context prefetch 210, a timer 220, a transmit processor 230, data and control blocks 240, acknowledge blocks 250, a scheduler 260 and a DMA engine 270. The components may be coupled as set forth in FIG. 10. The timer 220 may comprise, for example, TCP state code transmit and retransmit timers. The scheduler 260 may be adapted for, for example, windowing and/or retransmit arbitration. The DMA engine 270 may comprise, for example, an XSUM block 280 or other data specific processing. This may comprise inserting of data into the data provided by the host and computing CRC values. The data processing is not limited to these functions.

On the transmission path, the support for L4 and higher levels may comprise additional complexity and functionality. Transmission may comprise performing, for example, one or more of the following: scheduling transmission flow; transferring data via DMA; fetching context; transmit processing; adding L5 or higher and TCP/IP headers, and properly filling in all of the fields of those headers; arming the timers; and L2 transmitting.

The scheduler 260 may decide which flow to serve next. The scheduler 260 may also handle multiplexing L2 and L4 and higher levels of traffic. With respect to L4 and higher levels of traffic, the decision to schedule a particular TCP/IP flow for transmission may depend upon, for example, one or more of the following factors: data availability for transmission on the host side; remote end buffering state such as when a remote TCP connection has not closed the TCP window; preventing starvation among the potentially large number of TCP connections competing for time on the Ethernet media; availability of TCP acknowledges from the receive side; a need to retransmit information on behalf of a TCP connection; and flow priority or quality of server (QoS) information passed to the TEEC from the host.

Utilizing some or all of the above-identified information or other information, the scheduler 260 may pick the next flow to be transmitted. The scheduler 260 may fetch the pointer to the next host resident buffer from the context information. The scheduler 260 may also program the DMA engine 270 to get the data and store the data, for example, in an elastic buffer 281. Although an elastic buffer 281 is shown, the invention is not so limited and an on-chip FIFO buffer or other suitable memory or buffering device may be utilized for storing the data in accordance with various embodiments of the invention.

The DMA engine 270 may transfer the data from the host buffer or buffers into, for example, an on-chip, transmit-side FIFO buffer. IP Checksum (IPv4) and TCP Checksum may be computed on the data being transferred. The computations may be performed concurrently with data movement. Higher levels of data processing may be done at this stage.

Flow context may be fetched, for example, by the context prefetch 210 from a central context resource. Accessing the central context resource may increase the usefulness of a locking mechanism among all of its consumers to ensure data integrity and coherency. The locking mechanism may be very efficient in minimizing undesired performance impact. The context for the selected flow may be provided to the transmit processor 230 such as a CPU and/or finite state machine (FSM).

The transmit processor 230 may be adapted, for example, to execute TCP/IP and higher levels of code, to update the context and to generate the TCP/IP and higher level header variables to be placed in the headers. The updated context may be stored. The processing for this stage may be performed by one or more stages including one or more processors, state machines or hybrid processors.

The header builder 200 may use the header variables generated by transmit processor 230 and may generate the TCP/IP and higher level headers and may attach the TCP/IP and higher level headers in front of the data to be transmitted. Using the partial checksum results obtained from the DMA engine 270, the header builder 200 may finalize the checksum fields and may place them in the respective headers. Transmit processing is not limited to a specific number of stages and processing and may be executed at different stages of processing as may be optimal.

The timer 220 may be armed by the transmit processor 230 and may update its future timer event list. When the L4 and higher levels of processing are complete, the L2 processing and transmission may follow the conventional steps performed by a conventional Ethernet controller.

A retransmission event is similar to a normal transmission except, for example, the data to be retransmitted may be fetched from the host buffers as before or from any other temporary holding buffers. The address for this data may be computed. The computation of the host buffer address may be more complex. The same mapping function described in the receive path section may be used for the retransmission TCP sequence number range. Once the buffer address is determined, the rest of the transmit process may occur as described above.

One or more of the embodiments of the present invention may have one or more of the advantages as set forth below.

The reduction in foot print may enable a single-chip implementation that may not require external memory. Foot print reduction may provide a size that is similar to that of a conventional non-offload Ethernet controller and therefore may allow its integration on the motherboards of servers and clients that are restricted in the real estate allocated for the LAN component. In other words, the solution may be utilized for LAN-On-Motherboard (LOM) applications. This is an advantage in the ever-shrinking form factors of clients and servers.

Since there may be no need to interface with the external memory, the cost of the solution may decrease. Not only may the cost of external memory be saved, but also the TEEC may become cheaper. There may be no need or the need may be reduced for machines that interface the memory and for I/O buffers to drive the machines. In turn, this may allow for a smaller package with fewer pins and higher performance Power and thermal concerns may be substantial growth inhibitors for the Data Center. By eliminating or reducing the external memory, the TEEC may reduce its power consumption. Thus, more condensed servers may be provided as there may be less heat to dissipate.

Latencies associated with the temporary buffering of the data may be saved. Some applications such as, for example, distributed database, clustering, high-performance-computing (HPC), Quality-of-Service (QoS) applications and other may appreciate the substantial savings in latencies.

There may be no speed coupling of the memory and the TEEC. As an architectural aspect of having an external memory attached to the TEEC, the speed and width of that memory may impact the internal architecture. The impact is even greater for the higher wire speeds. With the possibility of no external connection, the internal architecture is substantially simplified.

This may reduce the memory used by a TEEC on a NIC to merely the traditional FIFO buffer used for matching wire, internal processing latencies and host bus speeds. The memory requirements of this architecture may not scale with the number of connections and may be less sensitive to LAN or WAN configurations. Cost and size may be less affected by the bandwidth-distance product that is aggravated by large (world-wide) fast networks.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Portions of the present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A system for offloading TCP processing, the system comprising:
   a host;
   a network interface card (NIC) coupled to said host, said NIC comprising,
      a TCP enabled Ethernet controller (TEEC), said TEEC comprising,
         at least one internal elastic buffer, wherein said TEEC processes an incoming TOP packet once and temporarily buffers at least a portion of said incoming TOP packet in said internal elastic buffer, said processing occurring without reassembly.

2. The system according to claim 1, wherein said at least one internal elastic buffer comprises at least one of a receive internal elastic buffer and a transmit internal elastic buffer.

3. The system according to claim 2, wherein said at least a portion of said incoming TCP packet is temporarily buffered in said receive internal elastic buffer.

4. The system according to claim 2, wherein at least a portion of a TCP packet to be transmitted is temporarily buffered in said transmit internal elastic buffer.

5. The system according to claim 1, wherein said TEEC places at least a portion of said incoming TCP packet data into at least a portion of a host memory.

6. The system according to claim 1, wherein said NIC utilizes only said at least one internal elastic buffer to temporarily buffer said at least a portion of said incoming TCP packet.

7. The system according to claim 1, wherein out-of-order TCP packets are not at least one of stored, re-ordered and re-assembled in a TEEC buffer.

8. The system according to claim 1, wherein said NIC does not require a dedicated memory for re-ordering out-of-sequence TCP packets.

9. The system according to claim 1, wherein said NIC does not require a dedicated memory for assembling and re-ordering IP packets fragmented at the IP layer.

10. The system according to claim 1, wherein said TEEC places at least data from said incoming TCP packet into a highest hierarchy of buffer available in a host memory by performing a single copy operation.

11. The system according to claim 1, wherein said TEEC DMA transfers at least a portion of said processed incoming TCP packet to at least a portion of a host memory.

12. The system according to claim 1, wherein said NIC does not require a TCP off load engine (TOE) dedicated memory for at least one of packet retransmission and packet reassembly.

13. The system according to claim 1, wherein said TEEC places at least a portion of said processed incoming TCP packets into host buffers in a host memory for reassembly.

14. The system according to claim 1, wherein said TEEC comprises a single chip, having integrated therein, said at least one internal elastic buffer.

15. The system according to claim 1, wherein said TEEC comprises a single chip, having integrated therein, said at least one internal elastic buffer, and no internal buffers and interfaces to external buffers, that are utilized for at least one of packet retransmission, packet reassembly and packet re-ordering.

16. A method for offloading TCP processing, the method comprising:
  receiving an incoming TCP packet at a TCP enabled Ethernet controller (TEEC);
  processing at least a portion of said incoming packet once by said TEEC without reassembly; and
  temporarily buffering said at least a portion of said incoming TCP packet in at least one internal elastic buffer of said TEEC.

17. The method according to claim 16, wherein said at least one internal elastic buffer comprises at least one of a receive internal elastic buffer and a transmit internal elastic buffer.

18. The method according to claim 17, further comprising temporarily buffering said at least a portion of said incoming TCP packet in said receive internal elastic buffer.

19. The method according to claim 16, further comprising placing at least a portion of said processed at least a portion of said incoming packet in at least a portion of a host memory.

20. The method according to claim 16, wherein said placing further comprises placing at least a portion of said processed incoming TCP packet in a highest hierarchy of buffer available in a host memory by performing a single copy operation.

21. The method according to claim 16, further comprising DMA transferring at least a portion of said processed incoming TCP packet in at least a portion of a host memory.

22. The method according to claim 16, wherein packets temporarily buffered in said in at least one internal elastic buffer are not buffered for at least one of reassembly and retransmission.

23. The method according to claim 16, further comprising placing at least a portion of said processed incoming TCP packet in host buffers in a host memory for processing.

24. The method according to claim 16, wherein said TEEC comprises a single chip, having integrated therein, said at least one internal elastic buffer.

25. A machine-readable storage, having stored thereon, a computer program having at least one code section for providing TCP offload, the at least one code section being executable by a machine for causing the machine to perform steps comprising:
  receiving an incoming TCP packet at a TCP enabled Ethernet controller (TEEC);
  processing at least a portion of said incoming packet once by said TEEC without reassembly; and
  temporarily buffering said at least a portion of said incoming TCP packet in at least one internal elastic buffer of said TEEC.

26. The machine-readable storage according to claim 25, wherein said at least one internal elastic buffer comprises at least one of a receive internal elastic buffer and a transmit internal elastic buffer.

27. The machine-readable storage according to claim 26, code for temporarily buffering said at least a portion of said incoming TCP packet in said receive internal elastic buffer.

28. The machine-readable storage according to claim 25, further comprising code for placing at least a portion of said processed at least a portion of said incoming packet in at least a portion of a host memory.

29. The machine-readable storage according to claim 25, further comprising code for placing at least a portion of said processed incoming TCP packet in a highest hierarchy of buffer available in a host memory by performing a single copy operation.

30. The machine-readable storage according to claim 25, further comprising code for DMA transferring at least a portion of said processed incoming TCP packet in at least a portion of a host memory.

31. The machine-readable storage according to claim 25, wherein packets temporarily buffered in said in at least one internal elastic buffer are not buffered for at least one of reassembly and retransmission.

32. The machine-readable storage according to claim 25, further comprising code for placing at least a portion of said processed incoming TCP packet in host buffers in a host memory for processing.

33. The machine-readable storage according to claim 25, wherein said TEEC comprises a single chip, having integrated therein, said at least one internal elastic buffer.

* * * * *